United States Patent
Perdue et al.

(10) Patent No.: US 9,456,085 B1
(45) Date of Patent: Sep. 27, 2016

(54) MANAGING CONTACT ATTEMPTS TO AN ACCOUNT IN A CONTACT CENTER

(71) Applicant: Noble Systems Corporation, Atlanta, GA (US)

(72) Inventors: Andy E. Perdue, Atlanta, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 14/333,969

(22) Filed: Jul. 17, 2014

(51) Int. Cl.
*H04M 3/523* (2006.01)
*H04M 3/51* (2006.01)

(52) U.S. Cl.
CPC ......... *H04M 3/5232* (2013.01); *H04M 3/5158* (2013.01)

(58) Field of Classification Search
CPC ........... H04M 3/5158; H04M 3/5232; H04M 3/5236; H04M 2242/18; H04M 2201/42
USPC .................................................... 379/266.07
See application file for complete search history.

(56) References Cited

U.S. PATENT DOCUMENTS

2002/0090964 A1* 7/2002 Harder ................ H04M 3/5158
455/466

OTHER PUBLICATIONS

Nobles Systems Corporation, Maestro Apr. 1, 2010 User Manual, vol. 1, Jan. 11, 2012, 486 Pages Noble Systems Corporation, Atlanta, GA 30319.
Nobles Systems Corporation, Maestro Apr. 1, 2010 User Manual, vol. 2, Jul. 19, 2011, 422 Pages Noble Systems Corporation, Atlanta, GA 30319.

* cited by examiner

*Primary Examiner* — Antim Shah

(57) ABSTRACT

A party associated with multiple contact addresses, such as a home, cell, and/or work telephone numbers, is contacted by a dialer using a contact attempt sequence that defines how the various contact addresses are used. A graphical user interface allows a user to create a visual representation of the contact attempt sequence flow for contacting the party, e.g., a template, where logic is defined indicating how and when the various contact addresses are to be used. Thus, in one instance, the dialer may use the template to make multiple attempts to reach the party using first their home number and then their cell phone number, and if such attempts are unsuccessful, then make a further attempt to the reach the party using their work number, wherein attempts to reach the party using the home, cell, and/or work phone numbers may be limited over one or more defined time periods.

9 Claims, 20 Drawing Sheets

| Type of Number | Maximum Call Attempts | Current Call Attempts | Number Specific Time Period |
|---|---|---|---|
| Home | 4 | 3 | 1 day |
| Cell | 3 | 2 | 1 Week |
| Work | 1 | 1 | 1 Week |

Overall Time Period .................................................. 1 Week

Aggregate Max Call Attempts Per Overall Time Period .....20

FIG. 5A

| Sequence Number | Type of Number | Maximum Call Attempts Per Number-Specific Time Period | Number-Specific Time Period | Current Call Attempts | Max Call Attempts Per Overall Time Period | Consecutive Call Attempts Before Sequencing |
|---|---|---|---|---|---|---|
| 1 | Home | 4 | 1 day | 3 | 15 | 2 |
| 2 | Cell | 3 | 1 day | 2 | 6 | 1 |
| 3 | Work | 1 | 1 Week | 1 | 1 | 1 |

Overall Time Period .................................................. 1 Week

Aggregate Max Call Attempts Per Overall Time Period .....20

FIG. 5B

MANAGING CONTACT ATTEMPTS TO AN ACCOUNT IN A CONTACT CENTER

BACKGROUND

Contact centers frequently attempt to contact individuals associated with an account for a variety of purposes. For example, contact centers often reach out and contact individuals regarding delinquent accounts, e.g., past due debts. The account may be related to a credit card, a mortgage, a student loan, or some other type of instrument. Frequently, there may be a number of ways of reaching the account holder (also referred to herein as the debtor). For example, the account holder may have provided various telephone numbers that can be used to reach them, including a home telephone number, a cell phone number, a work telephone number, alternative residence number, spouse's telephone number, etc. In addition, the account holder may be reached by written correspondence at an address or by email although voice calls may be preferred by many contact centers for various applications as they are usually more effective. However, it may be appropriate to supplement or otherwise alternate the form of communication by mixing telephone calls and other message-based forms of communication.

Frequently, there is a choice as to when and how the account holder is contacted by a contact center. Various regulations, policies, or other considerations are relevant in selecting which telephone number to attempt, and when the call is initiated. One approach used in the past was to attempt to contact the account holder using any and each telephone number and as many times as possible, but this approach is no longer an acceptable technique and can be frequently counterproductive. It can also lead to a poor utilization of resources. Further, such an approach can be deemed as harassment, and other regulations may be applicable that impact the forms of communication used and when.

Contact centers may frequently service accounts from different clients. In this context, a "client" is a company that holds the debt and which may have retained a contact center to collect the debt on behalf of the client (or the contact center may be operated by the company itself). It is quite possible that a contact center may service accounts associated with different clients that are service providers such as retailers or banks. In these instances, oftentimes an individual account holder who is delinquent with one account of a first service provider may also be delinquent with another account of a second service provider (e.g., both service providers may provide similar services, such as retailers of household goods). This presents further issues with respect to how a contact center should contact an account holder when that account holder is affiliated with multiple client accounts serviced by the contact center.

A contact center may have the capabilities to program an order of different telephone numbers to use when attempting to contact an account holder. However, such capabilities may be limited, and frequently, whatever logic is defined must be used for all accounts in a calling campaign or for all accounts of a client. For example, a contact center may be configured to use a home number first and if unsuccessful, then use a mobile number. However, this logic may then be required to be applied for all accounts to be contacted. The contact center may not have the flexibility to use different logic for different accounts. In addition, more complicated logic flows may be desired that cannot be defined. Further, defining such logic may be complicated and error prone, and may require additional training and expertise.

Thus, systems and methods are required for providing a flexible, but easy to use, interface for defining various contact attempts sequences that specify how and when an account holder is to be contacted, as well as accommodating the use of multiple channels and telephone numbers associated with the account holder. It is with respect to these and other considerations that the concepts and technologies herein are presented.

BRIEF SUMMARY

In general, embodiments of the present invention include computer program products, methods, and systems for managing how a contact center may reach an account holder when there are multiple telephone numbers and/or contact channels that may be used for reaching the account holder. In one embodiment, rules are embodied in a data structure that are used to indicate what telephone numbers and/or contact channels that are to be used, as well as a sequence of the telephone numbers and/or contact channels, in order to reach the account holder. In certain embodiments, a number of contact attempts is maintained for each of the telephone numbers and contact channels used, as well as an aggregate contact attempt number of the attempts made for the various telephone numbers and channels associated with the account holder. This information may be used by logic indicating the sequence of the numbers and/or channels to use when attempting to contact the account holder. In certain embodiments, a graphical user interface is used by a contact center administrator to represent and define the contact attempt sequence used in attempting to contact the account holder.

As is discussed in greater detail below, the subject matter disclosed herein may be implemented as a computer-controlled apparatus, a method, a computing system, or as an article of manufacture such as a non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIGS. 5A-5B illustrate embodiments comprising data structures that may be used in defining a contact attempt sequence for contacting an account holder.

DETAILED DESCRIPTION

Figure 1:
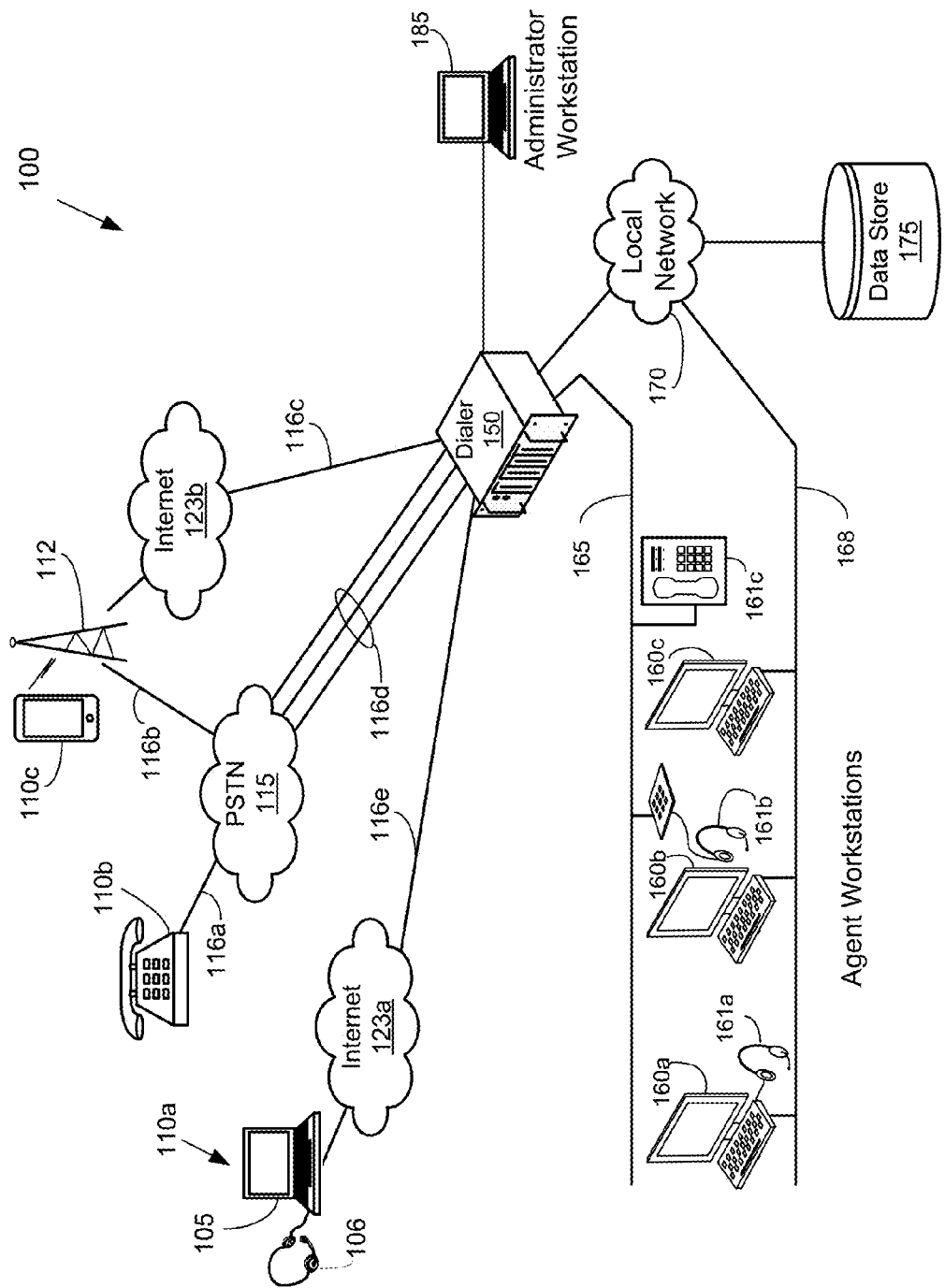
FIG. 1 shows one embodiment of a contact center architecture that may practice the various concepts and technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Embodiments of the invention may be utilized in various industries, as will become apparent to those of ordinary skill in the art as they read the disclosure. The principles of the invention are illustrated using contact center agents as employees, but the concepts and technologies disclosed herein could be applied to other types of employees and industries.

GLOSSARY

The following glossary provides definitions of the following terms used in this specification:

Contact Channel—also referred to as a "channel type". This is a form of communication, examples which include voice calls, text calls, etc.

Contact Attempt Sequence ("CAS")—the order in which contact addresses associated with an account are used to attempt communication with the account holder. The CAS may also specify the contact channels associated with the contact addresses. This term may be used generally to refer to a generic resulting sequence of addresses used to contact an account holder or it may refer to a particular instance of CAS logic defining a particular CAS.

CAS Logic—the algorithm (also referred to as "rule") that when applied defines or results in a particular CAS. This term may be used generally to refer to a generic algorithm that defines a CAS in general, or it may refer to a particular instance of CAS logic that defines a particular CAS. CAS Logic can be described in various ways, one of which is visually as a CAS Flow.

CAS Flow—the graphical representation of the CAS logic, derived from the programming concept of a "flow-chart." A particular instance of a CAS Flow is associated with a corresponding template.

Template—data representing CAS logic, which may be generated as a result of a CAS Flow. This term may be used generally to refer to data representing a generic CAS Logic or it may be used to refer to an instance of a particular CAS logic.

Contact Address—information that may be used to direct communication to an individual, such as an account holder. This may refer to a generic example or a specific instance for a specific individual. A common example of a contact address is a telephone number, sometimes referred to herein simply as a "number." In many contexts, the contact address is presumed to refer to a voice type call, but is not necessarily limited to a voice type call.

Account Holder—an individual associated with an account. In many examples provided herein, the account holder is the individual past due on a debt, but not necessarily.

Account—a collection of information associated with an individual having a business relationship with a business. In many applications, the information is of a financial focus, but not necessarily.

High Level Overview

Contact centers needing to reach an account holder typically have multiple telephone numbers ("numbers") that can be used to contact the account holder. For various reasons, it may be advantageous to use a certain order or sequence of the numbers when attempting to reach the individual. Frequently, the telephone numbers are used to initiate voice call attempts, but as will be seen, it is possible that the telephone numbers could be used to initiate other types of calls or forms of communication.

Defining this contact attempt sequence indicating which numbers to use and how in a flexible and easy to use manner can be challenging. In some embodiments, a relatively simple contact attempt sequence can be defined, such as attempting an account holder's home phone number first and if unsuccessful, then using the account holder's cell phone number next. However, other more sophisticated sequences may be desirable. Thus, the concepts and technologies disclosed herein provide a flexible and easy to use approach for defining various contact attempt sequences that can be used for initiating communication with an account holder. For convenience, each particular instance of a defined contact attempt sequence may be referred to as a "template." Accordingly, in particular embodiments, a template creation tool provides a system administrator with visually oriented means for creating, reviewing, and editing templates that can then be used by a dialer in a calling campaign to contact the account holder in the manner desired.

Contact Center Context

The concepts and technologies disclosed herein may be practiced in the context of a contact center. FIG. 1 shows one embodiment of a contact center architecture 100 illustrating the various technologies that may be involved when practicing the principles and concepts of the invention. The contact center shown in FIG. 1 may process voice calls that are inbound-only, outbound-only, or a combination of both (sometimes referred to as a "blended" contact center). For purposes of this invention, the focus is primarily on outbound calls because it is desirable to reach an account holder. In some instances, the contact center may be referred to as a call center, and this may be used also when referring primarily to the context of handling calls. Although many aspects of contact center's operation are disclosed in the context of voice calls, in various embodiments, the contact center may process other forms of communication such as, for example, facsimiles, emails, text messages (such as instance messages or short message service text message calls), video calls, and chat messages.

Since the contact center may handle calls originating from a calling party, or initiated to a called party, the term "party" or "remote party" without any further qualification, refers to a person associated with a call handled by the contact center, where the call is either received from, or placed to, the party. Depending on the embodiment, outbound voice calls may originate to the called party using a variety of different phone types. For instance, the called party may receive a call at a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Outbound voice calls may also be directed to the individual's smart phone device 110c, but could also be a mobile phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, also referred to herein as voice-over-IP ("VoIP") to/from an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Outbound voice calls may also be directed to a called party employing a so-called "IP phone," "VoIP phone," or "soft phone" 110a. In one embodiment, this device may comprise a computing device 105, such as a laptop, computing tablet, or other electronic device, which processes voice data and interfaces with a headphone/microphone combination, also referred to as a headset 106. The computing device 105 may in turn be connected to an Internet 123a. Those skilled in the art will recognize that a variety of protocols and facilities may be used to convey voice calls.

In some embodiments, a dialer 150, such as a predictive dialer, may be used to originate the outbound calls at a rate designed to meet various criteria, such as when an agent is expected to be available. A predictive dialer is a type of dialer that may originate calls to multiple telephone numbers simultaneously, with the expectation that an agent will be available to handle one or more of the calls that are answered. Other types of dialing methods may be used, such as preview dialing. In this dialing mode, information about an account is displayed to an agent to review. After the agent becomes familiar with the account status, the agent may then indicate to the dialer that the call may be originated to the account. In this way, when the called party answers the phone, the agent can interact with the account holder in an effective way. Other variations of dialers are known in the art, and can be used. Data associated with the calls and the accounts may be stored in a data store 175. After the calls are originated, a transfer operation may connect the call with an available agent, or if one is not available, place the call in a queue or play an announcement. In other instances, the dialer may terminate the call if no agent is readily available.

As will be seen, the dialer may be configured so that it attempts to establish communication with an account holder using a sequence of telephone numbers. For example, a first telephone number may be used and if no answer is encountered, then a second telephone number associated with the account may be used.

Once a call is answered, the dialer 150 may connect the call to an available agent by connecting the outbound call leg to the called party with another call leg that has been established to an available agent using contact center communication facilities 165. Depending on the embodiment, the facilities 165 may be any suitable technology for conveying the call, including but not limited to a local area network ("LAN"), wide area network ("WAN"), ISDN, or conventional TDM circuits.

In other embodiments, the outbound call leg may be connected to a call leg established to the agent's phone using a local network 170 over facilities 168. The exact details typically depend in part on the technology used. For example, the facilities 165 may be, in one embodiment, analog or proprietary voice communication technology whereas facilities 168 may be, e.g., SIP oriented. As may be appreciated, there are various technologies and configurations that are possible.

An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, that may be closely integrated with handling voice as well. Thus, for these particular embodiments, the workstation can be assumed to have at least a data capability and may have a voice capability.

Depending on the embodiment, the interaction between the dialer 150 and agent computers 160a-160c, as well as other components, may involve using a local area network ("LAN") 170. In particular embodiments, when an agent is interacting with the called party, the agent may use their computer 160a-160c to further interact with other enterprise computing systems, which may provide account level information to the agent. Typically, when the dialer connects the agent to an outbound call leg, data may also be presented to the agent using the agent's computer using facility 168. This may provide information about the called party, such as their associated account related information.

In addition to originating voice calls, the contact center may also originate emails, text messages, such as an "instant message" text message, a short message service ("SMS") text message, and facsimiles. In various embodiments, the party may receive various types of communications over the same address. For example, a telephone number may be able to receive an SMS, a voice call, or a facsimile call.

FIG. 1 also shows an administrator computer or workstation 185. This is a computer used by an administrator to configure various operational aspects of the dialer, as well as other components used in the contact center. This component is typically referred to as a workstation as well, as it may also have voice capabilities, though it is not required in all embodiments of the invention to have voice capabilities. Typically, if the administrative workstation does have voice capabilities, it is via a soft phone capability. Further, although FIG. 1 shows the administrator workstation 185 as being directly connected to the dialer, it may also utilize the LAN 170 for communicating with the dialer 150. As will be seen, the administrator workstation 185 may be used to configure the dialer to define various contact attempts sequences for various accounts.

Although a number of the above entities may be referred to as a "component," each may be also referred to in the art as a "computing device," "unit", "server", or "system." A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 1 represents one possible configuration of a contact center architecture 100, and variations are possible with respect to the protocols, facilities, components, technologies, and equipment used.

Service Overview

It is quite common for contact centers to attempt to reach an account holder using one or more telephone numbers ("numbers") associated with the account holder. The purpose for making the call may be for various reasons, and the concepts and technologies disclosed herein are illustrated in a debt-collection context. Specifically, the account holder is a debtor, and the contact center is contacting the debtor in an attempt to collect the debt. The contact center may be a separate entity providing a service to the debt holder or may be owned and operated by the debt holder. Attempting to collect the debt may entail obtaining a promise to pay from the debtor, which can further motivate the debtor to follow through with their promises of repaying their debt. In addition, these promises may be noted or recorded by the contact center, and used to further motivate the debtor to follow through with their promise of repaying their debt.

It can be appreciated that the purpose of the call may be for other reasons, and other contexts may use and benefit from the concepts and technologies disclosed herein. For example, in a medical context it may be necessary to contact a particular patient regarding medical treatment, and the patient may have provided various telephone numbers at which they can be reached. In another application, an employee may need to be contacted regarding working an upcoming shift, and may have provided various contact numbers. Thus, one skilled in the art of contact centers will recognize that the concepts and technologies disclosed herein are not limited to the context of debt collection calls.

As is quite common today, individuals may have multiple telephone numbers associated with them that can be used to reach them. An individual may have a wire line telephone number associated with their residence and a wireless telephone number associated with their cell phone. The same individual may also provide a work telephone number or another number which may be convenient. It is possible the individual may also provide a cell phone number of their spouse, partner, or other family member as an alternative telephone number.

In addition, individuals may move or change telephone numbers, and in the process may inform others of their new mobile number, but without explicitly indicating whether the other numbers are still applicable. Thus, it is frequently the case that a contact center may maintain a telephone number associated with an account holder that is obsolete, though this may not be known by the contact center until that number is used in an attempt to reach the account holder.

An individual providing a plurality of telephone numbers (or simply "numbers") may also indicate restrictions as to how and when they may be used. For example, an account holder may provide a number associated with a weekend residence frequented by the account holder along with instructions that the number should only be used during the weekends (e.g., it is only likely to be answered, if at all, during the weekend). As expected, contact centers typically maintain these various telephone numbers for an account, until they are certain that the number is no longer relevant. Accordingly, it is often the case that the contact center maintains several telephone numbers in association with the account information that could potentially be used to reach the individual account holder. Thus, when the contact center attempts to reach the account holder, the issue arises which number should be dialed first and under what conditions should the number be used.

In addition, it is possible to initiate different types of calls to a telephone number. For example, a telephone number may be used for fax communication and may also be used to send a SMS text message. Thus, information needs to be managed as to how the number is to be used. Henceforth, it may generally be assumed that reference to a "call" without any sort of qualifier may refer to any type of call (unless context dictates otherwise). In many instances, if the telephone number is a wireless number (e.g., associated with a smart phone), then that number may be able to receive a voice call or SMS call. On the other hand, many wire line devices can also receive a voice call and a fax call. Typically a smart phone cannot receive a fax call, though it may be possible if an appropriate mobile application is running on the smart phone. Further, many wire line devices that can receive a fax or voice call cannot receive a SMS call. As the use of smart phones is increasing, in many contexts herein the use of "call" refers to either a text call or voice call. When qualified, the qualifier (e.g., "text" or "voice") will refer to a specific form of call.

Past techniques in a contact center may have relied upon simply selecting any one of the numbers to originate a call to the account holder and originate calls to as many numbers as possible associated with the account holder at various times. This approach, which merely "blasts" as many call attempts as possible, is generally considered no longer acceptable by contact center operators. This approach can easily result in a large number of unproductive call attempts at various times of the day and may become quickly annoying to the account holder. Indeed, it may be viewed as harassing and can even become the basis for a lawsuit against the contact center.

Consequently, because the attempts to communicate with an account holder may be limited in some manner, a more deterministic approach is required that involves defining the sequence of numbers, and potentially the types of calls, used to contact the individual. This may require defining how many times a number can be used, what action should be taken based on the outcome of a call to a particular number, and what the next number to be used should be, presuming there is more than one number available.

For certain types of calls, such as debt collection calls, various statutes or regulations may govern when and how the account holder can be reached. Limits may be defined, either by federal agency regulation, state statute, or contact center policy, as to how many attempts may be made to an account holder during a particular time period. The limits may also govern the calling window (e.g., a specified time period during a day) when a call may be made to the debtor, how many attempts may be made to a given number, which numbers may be attempted, the sequence of numbers to attempt, and even an aggregate number of calls across various numbers associated with the account holder.

In regard to when a call may be made, various regulations may limit the hours when the recipient may be called. For some types of calls, calls are prohibited before 8:00 a.m. local time of the debtor or after 9:00 p.m. local time. "Local time" refers to the time zone where the called party is located, as the contact center may be located in a different time zone. This calling window is based on the premise that most individuals work during the day, and sleep during the night. It is possible that the different numbers associated with an account holder are associated with different time zones. For example, a primary residence of the called party may be in one time zone whereas a secondary residence may be in another time zone. As expected, at a given time a call may not be allowed using one number, but may be allowed using another number.

The number of call attempts to an account may be regulated, or otherwise restricted by the contact center. This value may be maintained by a counter referred to as a "maximum attempts counter" (or simply "max attempts counter") indicating the maximum number of attempts (i.e., the "count") that are allowed for an account during a defined time period. The number of attempts to an account may be limited for a recurring time period, such as attempts during a day, a week, or a month. In other embodiments, the attempts may be defined with respect to a number of immediately preceding days. This number may be referred to as the "current attempts count" and the register maintaining this value may be referred to as the "current attempts counter." Frequently, the value of the current attempts count is "reset" to zero at the beginning of the time period for a new cycle, whatever that time period is defined as.

In various embodiments, the definition of "attempt" may be any call attempt to the number, regardless of its completion status. In other embodiments, the definition of "attempt" may only encompass calls which resulted in encountering a non-busy condition. Unless stated otherwise, the scope of a voice call "attempt" encompasses any call attempt to the number, regardless of outcome. In the context of a text call, usually each attempt to transmit an SMS text results in the actual transmittal of the SMS text, which is presumed to be conveyed to the destination. Since the concept of "busy", "no-answer", and other such conditions associated with a voice call do not have a corresponding condition for a text call, each text call initiated is usually equated to a successful instance of a communication and vice versa.

An attempt that is "successful" may be considered as a communication attempt that was answered, answered by a person, or answered by the desired person. In some instances, a call that was answered may have been answered by a voice mail service or answering machine, so such calls may not be considered as "successful." In other instances, a call answered by a human (e.g., the call is not answered by a voice mail service or answering machine) is not considered as successful, since the desired party has not been reached. When the desired party does answer the call, this is sometimes referred to as a "right party connect."

There may be different max attempts counters, each associated with a distinct current attempts count and a distinct time period. These counters may be associated with a specific number of an account or reflect counts associated with various numbers of the same account. It is even possible to define a counter that reflects calls made to an individual over multiple accounts. These counters reflect call attempts and may be used to enforce limits of call attempts that may be defined not only for a particular number of an account, but for a set of numbers and various conditions associated with that account. For example, a home number may be called up to four times a day and a work number may be called once per week. These would have different counters and different time periods for each. Finally, another counter may limit the number of aggregate attempts made to the account holder using the combined attempts of the home number and the work number during a given week. As it will be seen, the concepts and technologies presented herein provide for a flexible framework for defining how an account holder can be reached by using the various telephone numbers associated with that account.

Other factors may impact the sequence of the different numbers for an account that are selected for dialing. There may be a default sequence of numbers to call, and that sequence may be further impacted by how many incompletes are allowable for a given number before advancing or sequencing to the next number. An "incomplete" call (or simply an "incomplete") may be defined as a call which does not encounter a "right party connect." Thus, an incomplete call may be a call, for example, that reaches busy, remains unanswered, answered by voice mail, answered by the wrong party, or that encounters an intercept announcement indicating that the number has been disconnected.

Depending on the reason for the incomplete, additional call attempts to the same or a different number may be attempted. Typically, if the incomplete is due to a busy or no-answer condition, additional attempts may be made to the same number, unless the max attempts counter for that number is reached. In a typical scenario, a first number is attempted a certain number of times. If the attempts are unsuccessful, then a second number of the account is then used. The process then repeats, that is, the second number is attempted a certain number of times and if there is no right party connect, then a third number associated with the account is used. If at any point during the process a right party connect is achieved (or whatever is defined to be a "successful" call is achieved), then no further attempts in the sequence of numbers are made. Of course, if all attempts for all the numbers are unsuccessful, it is possible that the cycle may be restarted again in the future. It is also possible that if a contact attempt is successful (e.g., the debtor is reached and promises to pay on their debt) that subsequent call attempts will be made again to the debtor (e.g., the debtor may fail to follow through on their promise to pay).

The sequence of numbers to use for an account, when to use them, how to use them, and under what conditions, is referred to herein as the "contact sequence" or "contact attempt sequence." The data defining all the necessary information for a dialer to execute the CAS may be referred to as a "template" and may be stored with a defined structure. Thus, to an extent, the scope of a contact attempt sequence and a template are similar, and in certain instances the template can be thought of as a specific instance of a contact sequence. As it will be seen, different contact sequences can be defined for different accounts.

Process Flows

Various embodiments of the concepts are reflected in the process flows contained in the figures. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Figure 2:
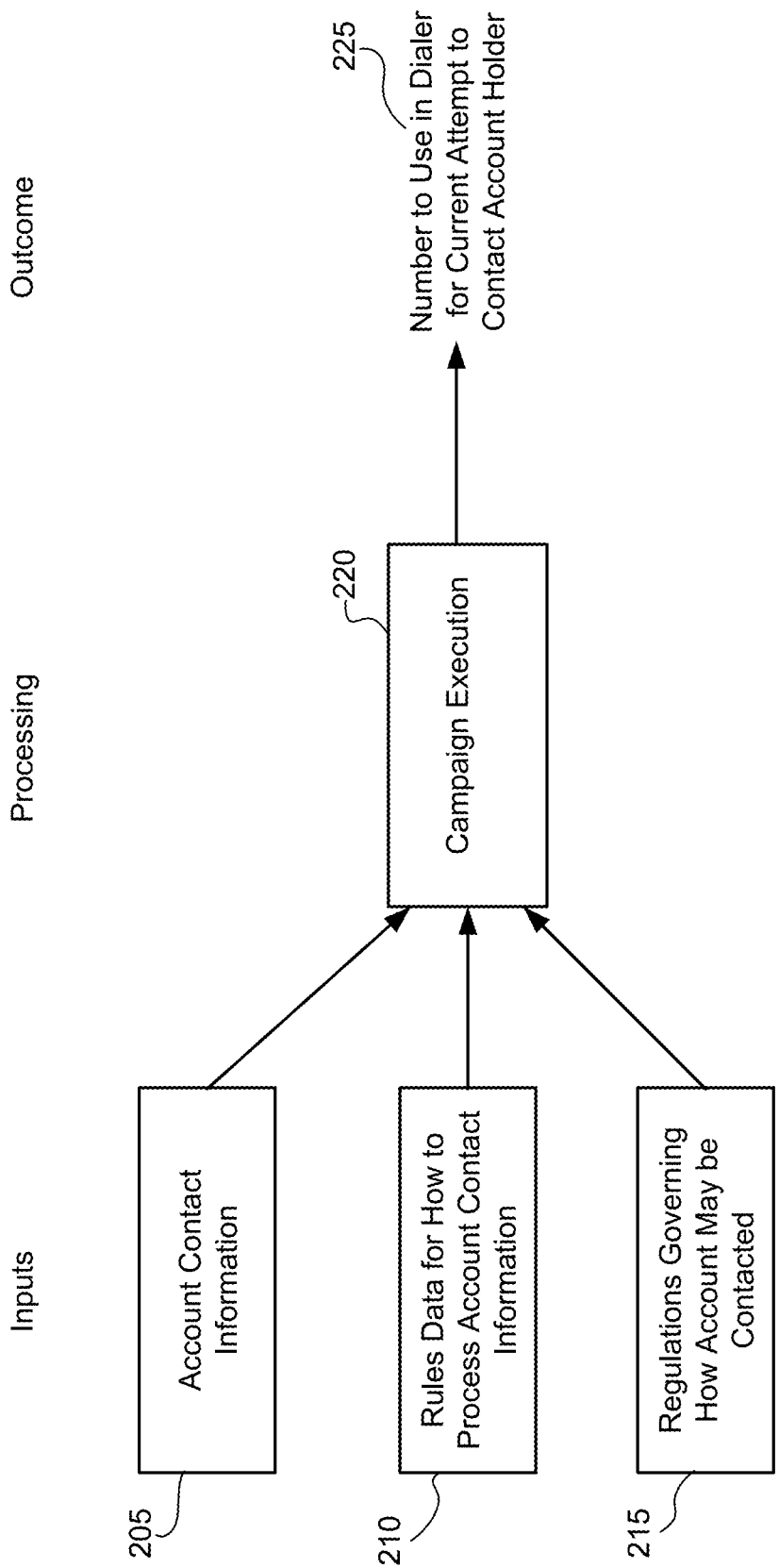
FIG. 2 illustrates an overview of information that may be used to ascertain a telephone number in a contact attempt sequence to use to reach an account holder.

Turning to FIG. 2, a high level overview of the inputs, processing, and output is illustrated. The overall purpose of the processing may be, in one embodiment, to determine an appropriate (next) number to use in a dialer for contacting the account holder. As will be seen, the output may also indicate the appropriate type of communication that should be initiated (e.g., a text or voice call). The output 225 can be represented as the number to use for the next attempt. This output may vary with time, and hence FIG. 2 illustrates the output at a given point in time.

The output is determined by considering various inputs, including the account contact information 205, various rules indicating how to process the account contact information 210, and other regulations that may govern how the account holder may be contacted 215. The account contact information 205 comprises various information, and typically includes one or more telephone numbers and potentially other forms of contact addresses associated with the account holder. The account contact information 205 may also include information as to the nature of the number (e.g., home, work, cell phone, etc.). In other embodiments, the account contact information 205 may include fax-related information, email-related information, or even postal address information.

The rules data 210 and the regulatory information 215 may be segregated as two types of rules used for defining the contact attempt sequence. It is also possible to consider the "rules data" 210 as encompassing regulatory information, with the regulatory information being a sub-category thereof. The rules data 210 comprises logic that is to be used for determining which of the numbers to select for the next contact attempt. The regulations 215 may provide additional limitations that must be considered before attempting the communication. The set of regulations 215 is shown as a separate component in the figure merely because regulatory information is dictated by regulatory bodies whereas rules data 215 is normally generated by the contact center. In other embodiments, a single set of combined regulatory rules and contact center rules may be defined.

These inputs 205, 210, and 215 are processed during campaign execution 220 to ascertain the output 225 that is the appropriate number to use for contacting the account holder. Once a number is used, and assuming that contact with the account holder has not been successful, then the campaign execution may repeat the process to determine the next number to use in an attempt to contact the account holder, based on the rules data and regulatory information.

Thus, the campaign execution process 220 may produce a series of numbers that are to be used over time when attempting to contact the account holder. In various embodiments, each number of the series of numbers may be produced one at a time as needed, or in a batch, and then used as needed.

This structure allows flexibility in defining the contact attempt sequence for an account. It is possible that the contact attempt sequence for an account may be different than another account. This may be based on the different account contact information in an account, or the application of different rules data or regulations covering that account. For example, one account holder may have a cell phone number and a home phone number indicated in their account contact information. A simple account contact attempt sequence may involve using the cell phone number first, and if not successful, then using the home phone number. Another account holder may have provided a work number, cell phone number, and home number. The contact attempt sequence in this case may try the home number first, followed by the cell phone number, and repeat this several times before attempting the work number. In the latter case, the account has both different account contact information and different rules data applying the account information.

There may be a variety of reasons for having different contact attempt sequences for different account holders. In the above example, the two account holders have provided different contact address information, e.g., one has provided a work number and the other has not. In other scenarios, an account holder may not have a cell phone, or may not have a home number, or may have two home numbers. Thus, the fact that different contact numbers exist for different account holders almost necessitates the need to define different contact attempt sequences. Of course, the same contact attempt sequence for both accounts could be used, but doing so may result in not using the work number provided in the second example depending on how the sequence logic is defined.

In other contexts, different contact attempt sequences may be defined to accommodate different call types. If one of the contact numbers is for a cell phone, it may be possible to send a text call to the account holder as well as a voice call. It is further possible that one account holder may not provide authorization for having text calls sent to them, whereas another account holder may provide such authorization. Having different contact sequences would allow text calls to be sent where authorized, and not sent where not authorized.

In addition, it may be advantageous to use different contact attempt sequences to reflect different contact strategies. For example, in the debt collection context it may be beneficial to use different debt collection strategies based on the account holder's past history of responsiveness. Consider a first account holder that is typically current on their debt payment, but is late on a current payment. A contact sequence may involve attempting a voice call to the account holder at their cell phone number, and leaving a single message if the call is answered by a voice mail system (a so-called "gentle reminder" to submit payment). At this point, attempts to contact the account holder may be suspended for a while in expectation of the debtor submitting their payment. On the other hand, a second account holder that is frequently delinquent may require a more aggressive strategy that involves attempting to contact the individual using various numbers, and ensuring that an agent speaks with the debtor. In this case, the contact attempt sequence may be defined so that messages left on a voice mail system may be purposely avoided. In other embodiments, other factors may impact the contact attempt sequence used for a particular account.

Another factor which may cause a change in a contact attempt sequence is a change in the regulatory environment for a particular state in which the account holder resides in. For example, a state may change their statutes governing how many times a debtor can be contacted in a week by a debt collection agency. This may require changing the contact attempt sequence that was used to contact an account holder in that given state. For example, many states have not addressed the issue of whether a text call is to be treated the same as a voice call for various applications. It can be expected that states may modify or update their statutes (or interpretation thereof) when addressing the issue as to whether a text call is treated the same as a voice call for debt collection purposes. It can be anticipated that different states will take different positions and require different modifications to the contact attempt sequence for account holders in these different states. Alternatively, the account holder may move to a state that has different regulations from the account holder's prior residence, and thus this change may necessitate a change in the contact attempt sequence logic.

Figure 3:
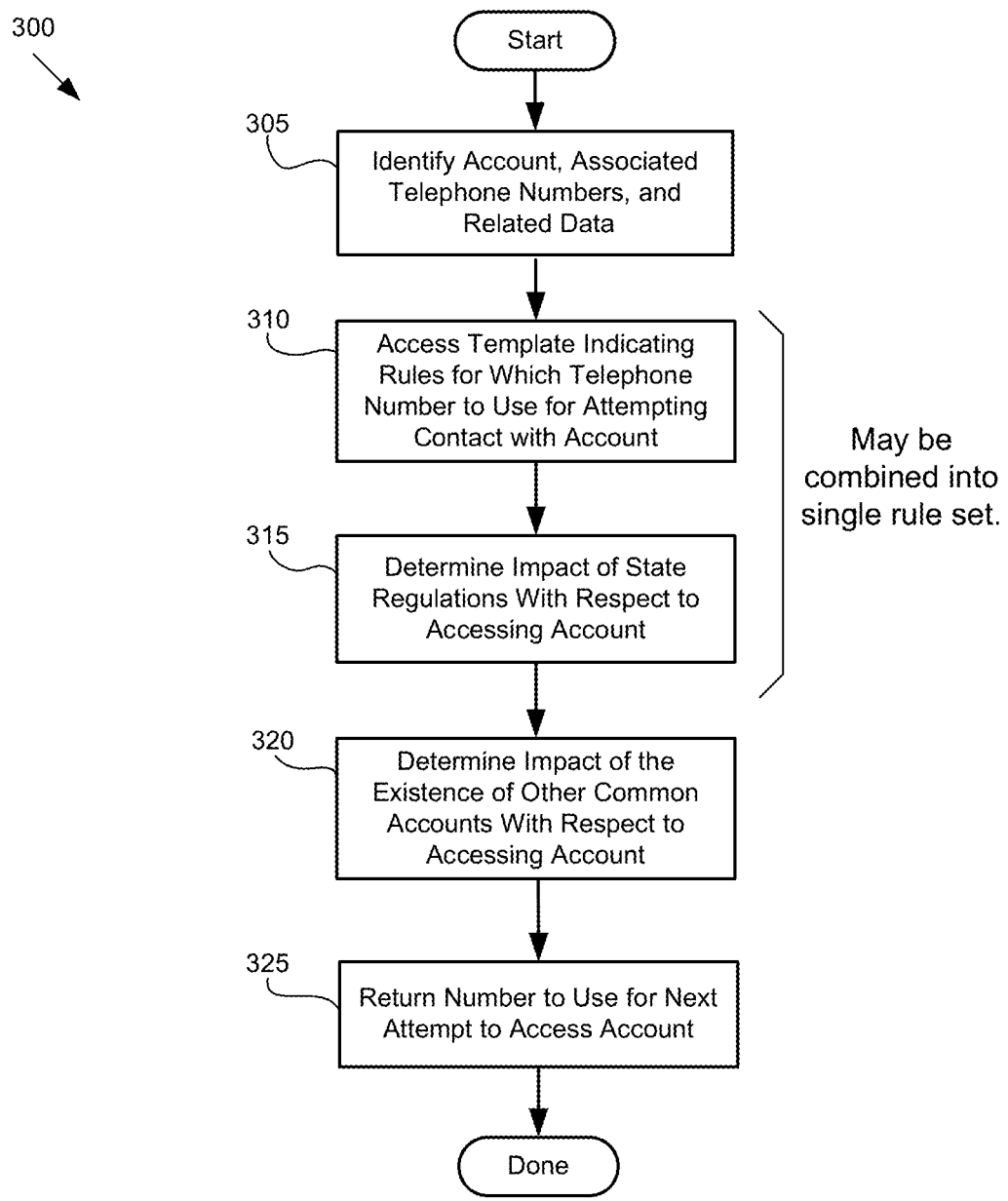
FIG. 3 illustrates one embodiment of a process flow to ascertain a telephone number in a contact attempt sequence to use to reach an account holder.

Consequently, there are various reasons why different templates may be created and used by a contact center for defining different contact attempt sequences to contact an account holder. FIG. 3 illustrates a more detailed view of a process related to the overview of FIG. 2. Turning to FIG. 3, the process 300 involves first identifying the relevant account and related account data in operation 305. This includes all necessary contact information associated with the account (such as telephone numbers), and may include information on previous call attempts. Call attempt information may include how many attempts occurred and their outcome for each telephone number.

Next, the template is accessed in operation 310. In this context, the template indicates a specific instance of the rules or logic used for indicating the contact attempt sequence, which determines which contact number to use next. In addition, information may be retrieved regarding state specific regulations that may impact how contact is to occur in operation 315. In various embodiments, the regulatory information may be reflected in the template, such that a separate operation is not required.

The selection of which number to use to contact the account holder may also be impacted by whether other accounts exist that involve the same account holder in operation 320. A brief example will illustrate an application. An individual may be delinquent on a credit card with Retailer A and also delinquent on a separate credit card with Retailer B. The contact center may be servicing both accounts, e.g., for both Retailers A and B. The contact center may decide to coordinate contacting the individual account holder based on both accounts. For example, the contact center may attempt to separately contact the account for both Retailers, but monitor the aggregate call attempts to the account holder. Thus, the contact center may decide to take a conservative approach and use the aggregate number of call attempts from both Retailers that it services. This approach may also be used in other contexts, such as a bank which may have separate car, home, and personal loan accounts with a single individual, and choose to coordinate debt collection call attempts across its various accounts. However, in many embodiments, the contact center does not encounter this situation, as the debtor is associated with only one retailer serviced by the contact center. Thus, operation 320 may not be required in all embodiments.

Once all the appropriate inputs are obtained, the rules and other data can be analyzed to determine the next number to be used by the contact center in operation 325. This number can then be used at the appropriate time to attempt a call to the account holder. The appropriate time may be immediately, or the next time an opportunity allows the account to be contacted. Once the account holder has been reached (e.g., a call is deemed to be successful), no further attempts to contact the account holder are necessary. Once an account holder is contacted, the contact attempt sequence is terminated, and it is assumed that no further immediate attempts are necessary to contact the account holder. It may be necessary, however, to restart attempts to reach the account holder in a following time period, if the need to collect the debt remains. In this case, the process may begin the contact sequence anew or may continue based on the last determination of the number to use.

Figure 4:
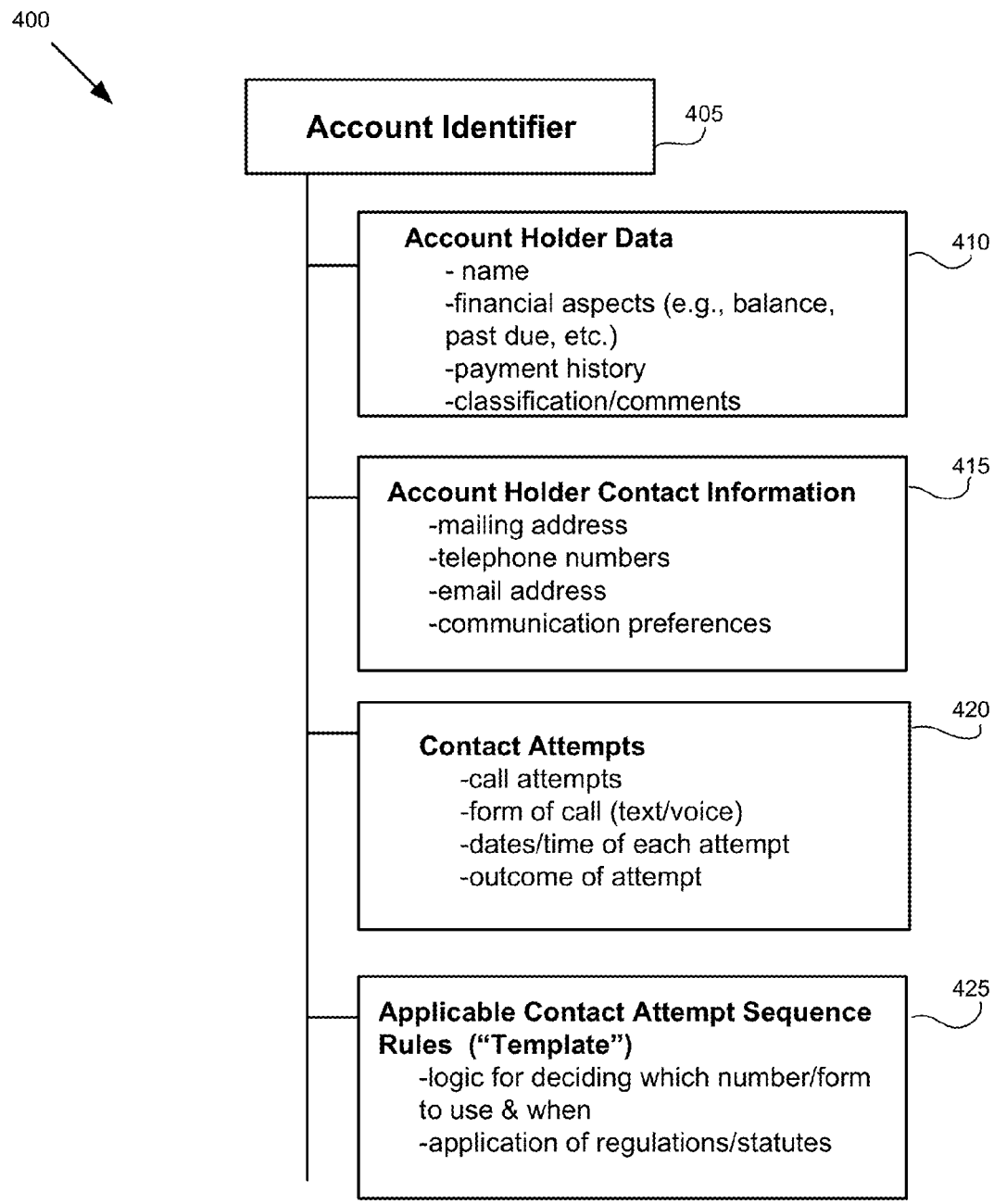
FIG. 4 illustrates a data structure that may be used in one embodiment in conjunction with a contact attempt sequence for reaching an account holder.

Data Structures (FIGS. 4-5)

The overview shown in FIG. 3 requires various types of data to be maintained and processed in the contact center, typically by the dialer. One embodiment of structuring the data is shown in FIG. 4. Turning to FIG. 4, a data structure hierarchy 400 comprises an account identifier 405 which serves to identify the overall account and links to any associated data. Associated with the account is a sub-data structure 410 that comprises various account holder data, such as the account holder's name, type of debt, financial information such as the current balance, past due status, payment amount, loan payoff date, etc. This may include other information such as classification (e.g., "gold membership") or other comments.

Another sub-data structure 415 that may be defined includes the various contact information associated with the individual. This may include mailing address, various telephone numbers, their types (e.g., home number, work number, cell number, etc.), as well as other information related to any form of communication that may be used, e.g., email address, etc. This may also include information such as indications of express written consent, preferences for how/when each communication channel is to be used. Thus, an account user may indicate that a secondary telephone number is only potentially answered on weekends, or that SMS texts are not acceptable on their work cell phone number. Thus, any information related to how the account holder can be contacted may be contained in a sub-data structure 415.

Another sub-data structure 420 is historical data related to when the account holder was contacted. This may include the number and type of each attempt for each form of communication, when the attempt was made, and the outcome. In some embodiments, this may be merged into the account holder contact information sub-data structure 415.

The last sub-data structure 425 is data related to the applicable contact attempt sequence rules (e.g., the template). In one embodiment, the data structure 400 may link or identify a template stored in another location that identifies the rules for contacting the account holder, or it may store the rules themselves. The information in this data structure 425 indicates how the contact information and the contact attempt information are used to determine which telephone number the account holder should be contacted on. In other embodiments, this information may also define which type of communication channel is to be used and/or when the attempt should be made.

The overall structure 400 illustrated is just one embodiment as to how information associated with an account can be structured. Other embodiments may structure the information differently than illustrated, such as having greater or fewer separate sub-data structures, and still apply the concepts and principles illustrated herein. A purpose of structuring the information is to facilitate storage and processing by defining certain information that is typically used in groups or that can be modified independently from other types of information. For example, segregating the rules (e.g., the Template 425) from the contact information and contact attempts allows the rules to be easily updated or substituted as appropriate. For example, if the account holder moves to another state, the contact attempt sequence rules 425 can be updated without having to update, read, or process the other types of data. In other embodiments, a single data structure can be used that combines aspects of these data structures, but doing so may not always provide a desired level of modularity or flexibility.

The data structures used can be maintained in various forms known to those skilled in the art. A logical representation of one such form that may be used is a tabular data structure, and FIGS. 5A and 5B illustrate potential embodiments of the account holder contact information, combined with portions of the contact attempt data, and further combined with some data related to rule processing. The examples of FIGS. 5A and 5B can illustrate how different contact sequences can be used to reach an account holder. Specifically, these examples illustrate how the different telephone numbers associated with an account holder can be used in an attempt to reach the account holder.

FIG. 5A shows one tabular oriented data structure 500 which employs a column indicating a type of number 520 for an account holder. A maximum number of call attempts column 522 defines the maximum number of call attempts allowed for the number. A current call attempts column 524 tracks the number of attempts that have been attempted so far, and the last column indicates the applicable specific time period that the previous columns apply to. For example, the first row indicates a home number that can be dialed up to 4 times in a day, and currently there have been 3 attempts made. Similarly, the cell phone number can be dialed 3 times in a week, and currently there have been 2 attempts made in the past week.

Other information may be associated with the contact sequence, which is detailed in information 505 and 510. This information may not lend itself to being represented using the tabular oriented representation 500. The first information 505 indicates that an overall time period is defined as 1 week, and the second information 510 indicates an aggregate maximum number of call attempts that are allowed in the overall time period, which is indicated as 20.

One possible template (e.g., the rules and logic defined for processing the data in table data structure 500) could indicate processing logic that first determines whether the aggregate maximum call attempts 510 for the overall time period 505 has been reached. If so, then the process may have to wait, for example, until the beginning of a new week. If the aggregate call attempts has not been reached, then the process could randomly select one of the other numbers, e.g., a type of number (e.g., home, cell, or work) and determine whether the maximum number of current call attempts for that number type has been reached, and if not, then attempt a call using that number. If the maximum number of call attempts has been reached, then another telephone number could be selected and tested. This process could occur when executing a dialing list, or could occur when the telephone number is selected each day when the dialing list is executed.

This illustrates a rudimentary example of how a contact attempt sequence could be defined using contact information about the account holder, along with various limitations that are defined for the maximum number of attempts for the account and for each number in the account. This example serves to illustrate the concept of a contact attempt sequence and how data can be used to define a template for how numbers are selected. This example, however, may not be realistic, as the selection of random numbers to dial may not allow the contact center to control the specific order in which numbers are used.

In other embodiments, the contact attempt sequence may be more sophisticated. For example, some states may restrict contacting a debtor at work by phone, unless attempts to contact the debtor at home are unsuccessful, and furthermore, states may require that attempts to contact the debtor at work are limited to once per week. In this case, the random selection of the number to dial provided in the above example is not sufficient to ensure compliance with this requirement. To illustrate this contact attempt sequence, FIG. 5B is used.

FIG. 5B illustrates another tabular oriented data structure 550 which again lists various columns of information. The first column 570 lists a sequence number, which designates the first, second, and third number to be used when attempting to reach the account holder. The second column 526 again indicates the type of number, the third column 574 again indicates the maximum allowed number of attempts, the fourth column 576 indicates the applicable time period for the maximum number of call attempts, and the fifth column 578 indicates the current number of call attempts to the corresponding number for the number-specific time period. The next column 580 indicates the maximum number of call attempts for the overall time period, and the last column 582 indicates how many consecutive call attempts are to be made before sequencing on to the next number. Other information 555 and 560 defines the overall time period and the maximum number of call attempts respectively.

In this example, the template logic for processing the data may select the first sequence number and attempt to dial that number until one of the conditions is met which terminates usage of that number, and then selects the second number in the sequence and repeats the process. Assuming that the overall number of call attempts (20) in a week has not been exceeded, the first number is used and attempted. According to the first row of table 550, the first number may have been attempted 3 times in the current day, but usage cannot exceed 4 attempts per day. Further, after 2 consecutive call attempts, the next number should be selected. Thus, the cell phone number is attempted next, providing that it has not been used more than 3 times in the current day and no more than 6 times in the overall time period (which is one week). After this attempt is unsuccessful, the third number in the sequence is attempted. This is the work number, and it cannot be used more than 1 time per week, and no more than 1 time for the overall time period (which also is one week). After this attempt, the sequence number would return back to the first number.

The rate at which the different sequence numbers is attempted can vary, and may be coordinated with the overall time period. For example, all sequence numbers could be attempted in one day, or a partial number thereof each day. Or, a single sequence number may be selected and attempted each day until a limit is reached, and the following sequence number may be selected and attempted the following day.

In summary, each of the numbers is attempted in order of the sequence number, and for each attempt, the overall maximum call attempts is checked, as is the number-specific limitations. In this example, the account holder's home number is attempted first, then the cell phone, and only if these attempts are unsuccessful, is the work number attempted. Further, the work number is limited to being used no more than once per week. This example of a contact attempt sequence may be used in a manner that is compatible with the above mentioned restrictions regarding contacting a debtor in which the debtor's work number is only attempted if attempts to the home number are unsuccessful, and no attempt to the work number has occurred for the week.

Exemplary Contact Sequence Flow

Figure 6:
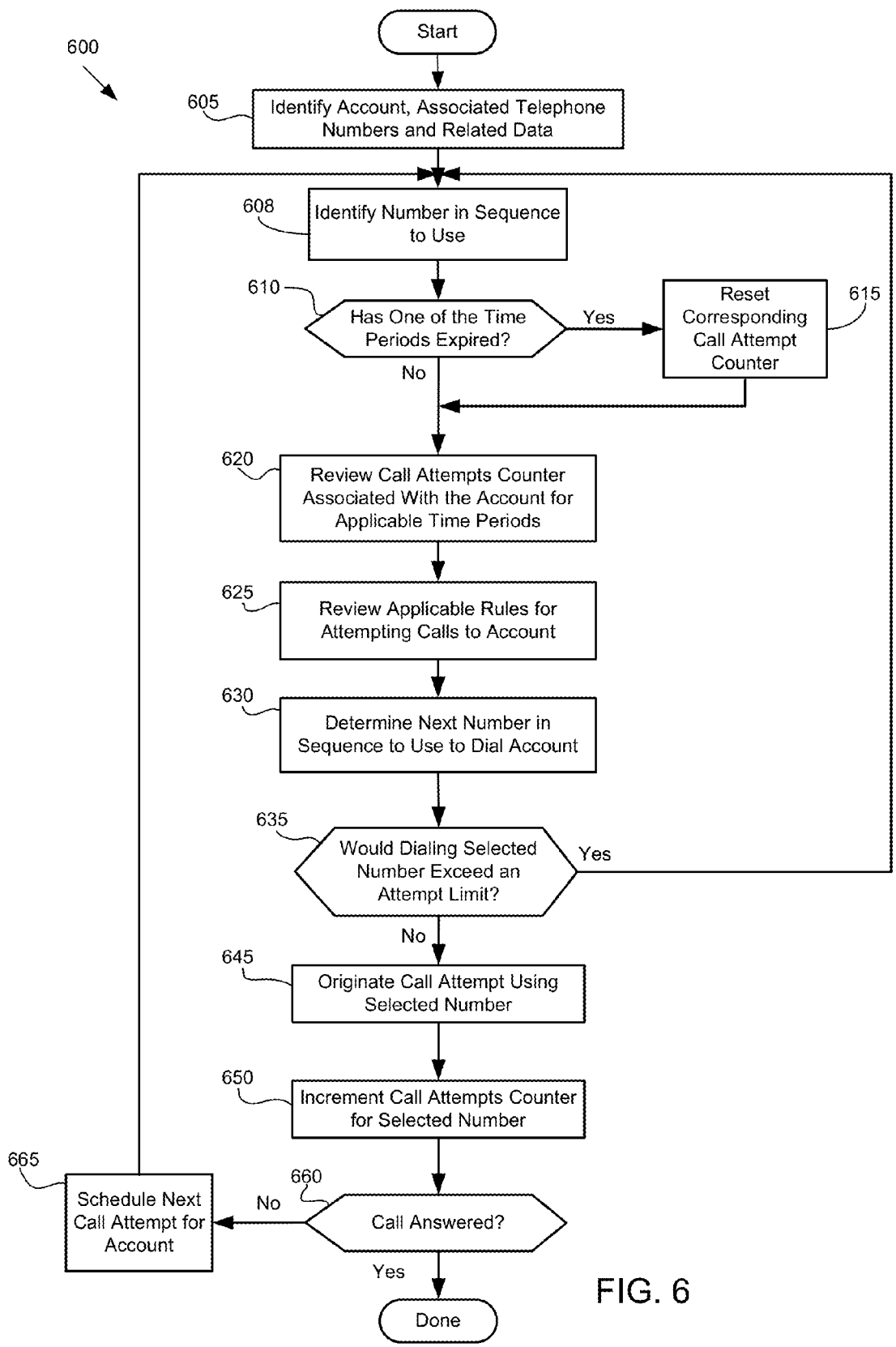
FIGS. 6-7 illustrate embodiments of process flows for defining a contact attempt sequence for contacting an account holder.

An exemplary process flow illustrating how a data structure could be processed for affecting a contact sequence is shown in FIG. 6. The process 600 begins with first identifying and retrieving the account and related information, such as the contact telephone numbers, call attempts, etc in operation 605. This information may include the indicated time periods, such as the overall time period previously described. In this example, it is presumed that an overall time period is defined to be a week, and begins each Monday.

Next, a number from the information identified in operation 605 is selected to be used in operation 608. The order of the numbers in a list may imply the order in which the numbers are to be used, e.g., the first number is used first, the second listed number is used next, etc. Other embodiments may have a sequence number indicating when the number should be used.

Next, a test determines whether any of the time periods associated with that number have expired in operation 610. On the initial pass, the time period will not have expired. When multiple passes are made over time, then it may be that one of the applicable time periods has expired. For example, if the overall time period is a week (e.g., there are limits as to how many times a number may be called in a week), then at the beginning of each week the call counter associated with that time period would be reset in operation 615. Similarly, call counters associated with daily call attempts limits would be reset each day.

Next, information is retrieved and reviewed in operation 620 and 625 as to the call attempts limits that are associated with the various contact numbers and the applicable rules for attempting calls to the account, respectively. Once this information is reviewed, then a determination is made in operation 630 as to the appropriate number to use when contacting the account. The logic in operation 630 may vary according to each embodiment, and reflects the particular processing rules defined. For instance, in the example discussed above for FIG. 5A, it was mentioned that this could be a random selection of the next number.

A test is performed to determine if dialing the identified number would exceed an attempt limit in operation 635. If so, then the process loops back to operation 608. If dialing the selected number is allowed, then the call attempt is originated using that number in operation 645. A call attempts counter is incremented to reflect the attempt in operation 650. If the call is answered in operation 660, then the process completes. This presumes that the appropriate party has answered the phone. As it will be seen, there are other instances where the call is answered, but the appropriate party has not answered the phone, and the process is not terminated. No further attempts are necessary once the call is answered. If the call is not answered in operation 660, then another call attempt is scheduled in operation 665 and the process loops back.

Note that there are many variations on this process flow that are possible. For example, if the call is not answered in operation 660, the process could continue, instead, to operation 608 where another number is selected and used instead. This depends on whether the process flow is to try a first number for the maximum amount of attempts before selecting the next number in the sequence, or the process flow should select the next number in the sequence as soon as a first attempt is unsuccessful.

In addition, the definition of a "call answered" in operation 660 may vary. This reflects whether the call attempt was "successful." A call reaching "busy" typically is considered as "unsuccessful" or as "not answered." However, a call may be answered by an answering machine. In this case, the call was answered, but may be considered as an "unsuccessful" call in that the right party was not reached. Many call centers focus on whether a "right party connect" ("RPC") was achieved, and any other outcome may be deemed as "unsuccessful" even though the call may or may not have been answered. Thus, various criteria may be used to determine whether the call was successfully answered at this stage.

In addition, a number of operations may occur in different order. A call may be attempted and then the call attempt counter may be incremented as shown in operation 645 and 650. In other embodiments, the call attempt counter may be incremented first, just before the call is attempted. Further, other embodiments may track whether a RPC occurred as a result of the call attempt or whether the call was answered without a RPC occurring. In other words, RPCs may be tracked and used instead of call attempts. Or, a combination thereof may be used based on the number being used.

Figure 7:
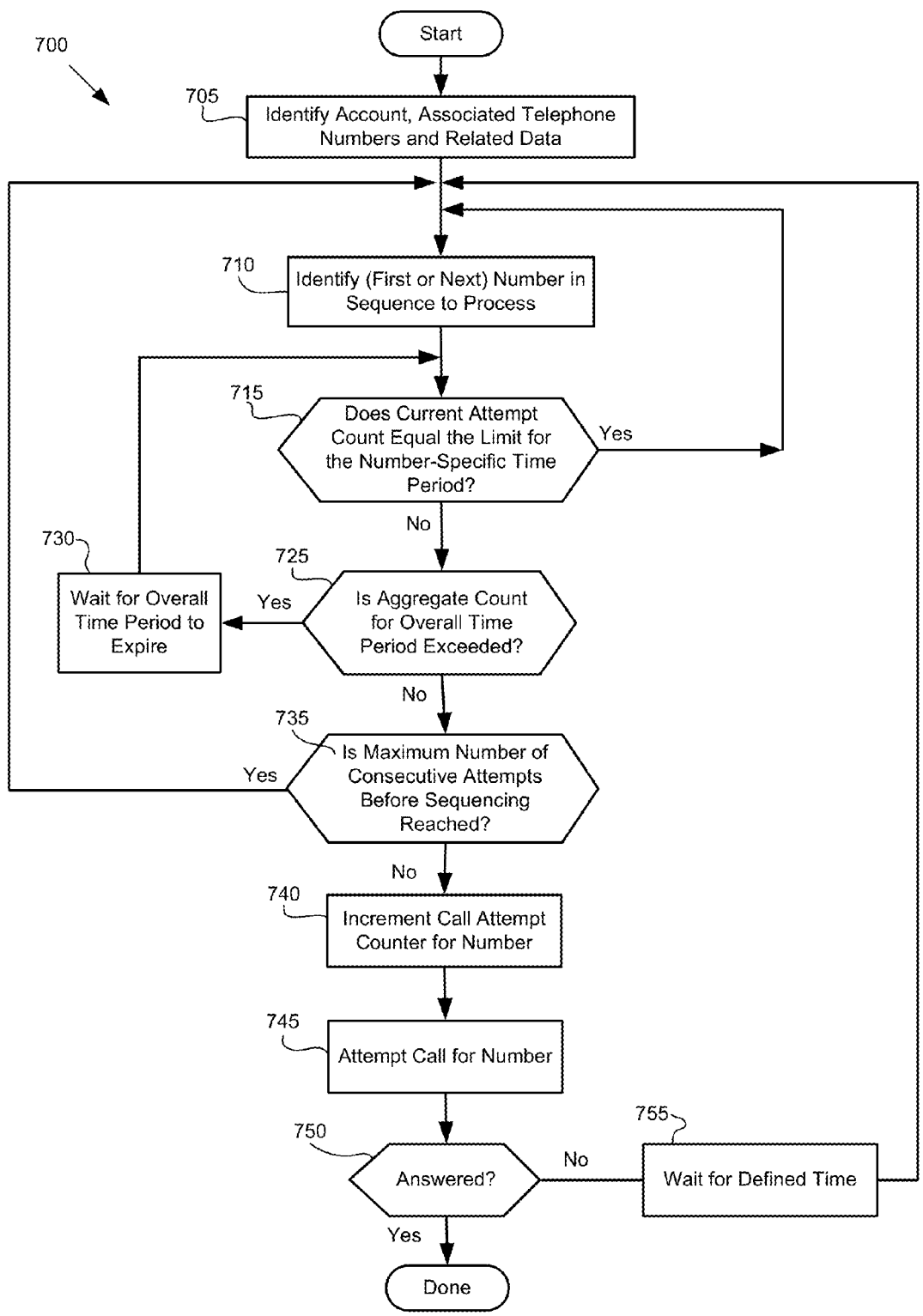

FIG. 7 shows one embodiment of a process flow that may operate on the data shown in FIG. 5B. For this process flow, the process 700 begins by identifying the account, associated telephone numbers, and related data in operation 705. Assuming this is the first pass through the process, the logic will identify the first number in the sequence to process in operation 710. Subsequent passes would identify the next number to process.

A test then determines whether the current attempts count equals the limit for that number's specific time period in operation 715. For example, based on FIG. 5B, calls to a home number may be limited to a maximum of 4 attempts in a day. If the maximum attempts are reached, e.g., the answer is yes, then the next number in the sequence is selected by looping back to operation 710. If the answer is no, then another test is performed in operation 725. This test determines whether the aggregate call attempts count has been reached for the overall time period. If the answer is yes, then no further attempts should be made until the overall time period ends. Thus, the process continues to operation 730 which waits for the expiry of the overall time period. Once the overall time period is reset, the process loops back to operation 715 where that number is tested to see if its maximum attempts have been reached.

If the aggregate number of calls is not exceeded in operation 725, then the process continues to another test which determines if the number of maximum consecutive call attempts before sequencing has been reached in operation 735. This operation ensures that attempts using a particular number do not use all of the allocated attempts before attempting another number.

If the limit is reached, the process loops back above, otherwise the process continues to operation 740 where the call counter is incremented in anticipation of making a call attempt. Next, the call is attempted using that number in operation 745.

The next test determines whether the call has been answered in operation 750. The definition of whether the call is answered may vary, as it may cover an answering machine picking up the call, or it may be limited to a RPC occurring. If so, the contact attempt sequence stops. If there is no answer, then a wait for a time period may occur in operation 755, and the process repeats.

Overall, the contact attempt sequence can be thought of as a series of tests which may limit a call attempt using a particular number, or any number for that account. These tests may be based on attempts during a defined time period and/or other considerations. If a call attempt results in achieving contact with the intended party, then the contact attempts have proved fruitful and no further foreseeable attempts are necessary. If the contact attempt is not successful (however that is defined), then the same or another number may be attempted either currently or in the future at some point. Obviously, the contact attempt sequence should be designed to avoid repeated unsuccessful contacts. For example, if a contact attempt to an account holder's home phone is unsuccessful, and then a contact attempt to the account holder's cell phone is unsuccessful, it is likely to be unproductive to immediately attempt to repeat the sequence. It may be, however, useful to repeat the contact attempt sequence later in the day, week, or some other time.

Cycling Through Contact Numbers

In FIG. 5B, a contact attempt sequence was based on attempting the first number, followed by the second number, etc. This presumes that the data structure and associated logic defines the numbers in a desired order and how they are processed. Further, it was mentioned that some numbers, such as the work number, may be limited to one attempt per week. The intended operation is that certain numbers may be attempted more than others.

Figure 8A:
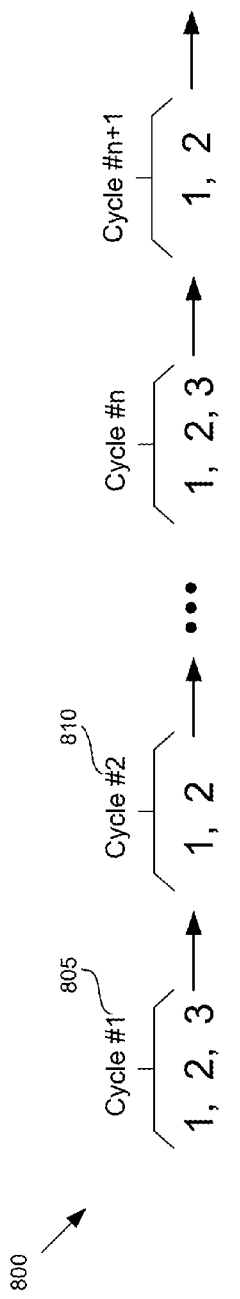
FIGS. 8A-8B illustrate contact attempt sequences that may result from the application of templates.

This process flow 800 is illustrated in FIG. 8A, which shows how the numbers may be attempted for the data structure shown in FIG. 5B. In FIG. 8A, the first cycle, cycle #1 805, involves attempting sequence numbers 1, 2 and 3 in that order (e.g., the home number, cell number, and work number). Assume that these numbers are attempted on a first day of the week. Then, if the account holder is not reached, these numbers may be attempted the following day, shown in FIG. 8A as cycle #2 810. In this case, since the work number was already attempted, it will not be attempted again until the week is over. The contact attempt sequence will then be the sequence numbers 1, 2 (e.g., home number and cell number). Further, on the third day (which is not shown in FIG. 8A), the cell phone will be attempted only one more time for that week, since its usage is limited to three attempts in a week. At some point, when a new week begins, shown at cycle #n, the sequence will revert back to attempting sequence numbers 1, 2, and 3. Presumably, at some point, the account holder will be reached, and the contact attempt sequence will end, but may resume again if the contact center needs to contact the account holder subsequently.

The cycles and the sequence of numbers shown in FIG. 8A show the result of one embodiment of processing the data structure shown in FIG. 5B. Those skilled in the art will recognize that varying the limits and altering the processing logic allows a variety of outcomes to occur. In this example, the data structure and associated processing thereof allows the contact center to define the order of numbers that should be used to reach the account holder, and allows the contact center to first try the home number of the account holder, and only if the account holder cannot be reached, is the work number then tried. Further, the process limits using the work number of the account holder to once a week. Thus, this contact attempt sequence allows compliance with various regulations, and also provides flexibility to adapt to other variations on this regulation. As evident from FIG. 8A, the result is a serial form of attempting the contact numbers for the account holder.

It may be desirable for the contact center to have further flexibility in defining how to sequence through the various contact numbers. For example, turning to FIG. 8B, a variation of one potential approach for sequencing through the contact numbers is shown. In this example, it is desirable to first sequence through numbers 1, 2, and 3 in cycle #1 and then based on a condition ("Condition X") to repeat cycle 1 or to execute cycle #2. Then, the process executes cycle #3, and then repeats the entire process flow 850.

Figure 8B:
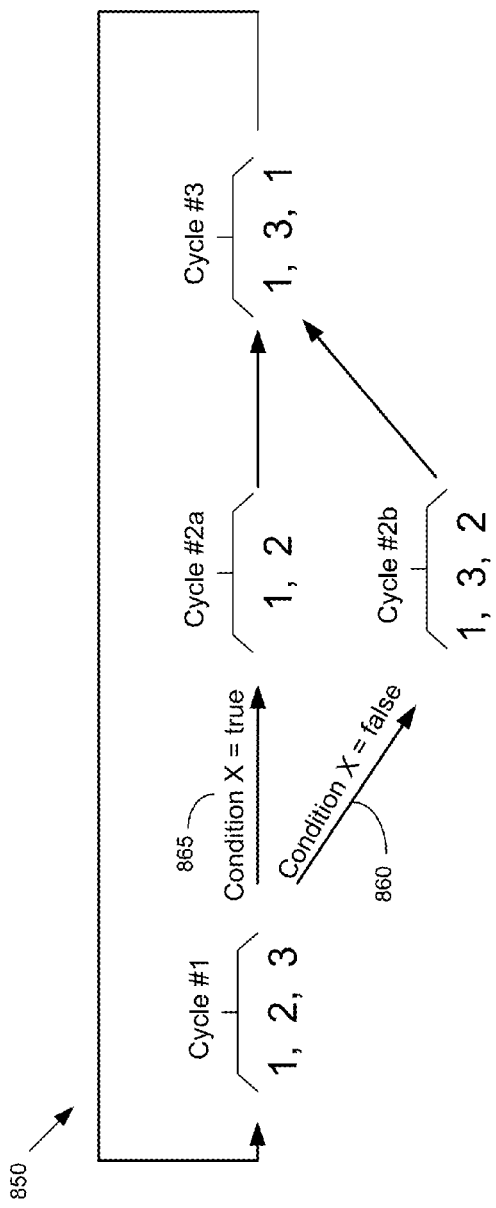

The Condition X observed after cycle #1 in FIG. 8B may be any variety of conditions. The condition could be a test as to whether one of the contact attempts results in leaving a voice mail message. For example, if a voice mail message was left on number 3 in cycle #1, e.g., the condition is true 865, then that number is not attempted in cycle #2*a*. If a message was not left, e.g., the condition is false 860, then the result is that cycle #2*b* occurs, which does repeat sequence number 3. Thereafter, in either case, cycle #3 is to occur.

The test could be a determination of an attempt status (busy, disconnect, etc.) or application of a particular state regulation. For example, if the account holder is in a state that limits call attempts to the work number, then Condition X may be true, otherwise, Condition X may be false. In another embodiment, the test could be a determination of the current day of week. It may be advantageous to avoid calling the account holder on their work number if the current day is Saturday, since it may be known that the account holder does not work on weekends. Any number of various tests may form the tested condition, which may be the basis for altering the sequence of numbers in a future cycle.

Graphical User Interface Tool

It may be possible to define a data structure, similar to FIG. 5B, along with processing logic, which would result in the cycle and sequence flow shown in FIG. 8B. This may necessitate additional processing logic and/or data columns incorporated into the data structure to result in the flow of FIG. 8B. However, it may not be obvious as to how the processing logic should be defined and what table structure is most appropriate to result in the desired sequence, and this may require a skilled system administrator or programmer to achieve a desired contact attempt sequence. A flexible and easy alternative is to first define the desired processing flow in graphical form, and use that flow to generate the appropriate data structure and processing logic. In other words, the user defines the resulting output of the contact attempt sequence as opposed to defining the structures and processing logic to achieve that flow.

Figure 9:
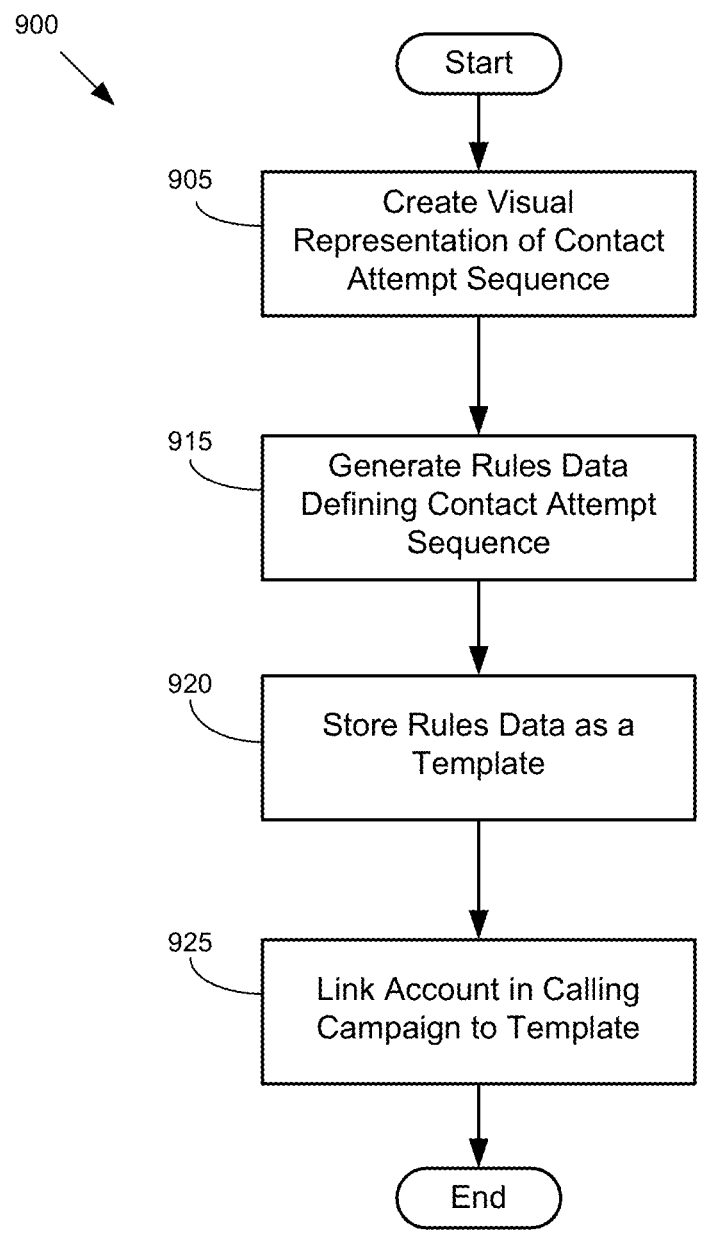
FIG. 9 illustrates one process flow for generating a template linked with an account for reaching the account holder.

Accordingly, a process shown in FIG. 9 may be employed. Turning to FIG. 9, the process 900 involves a user utilizing a graphical user interface ("GUI") tool in operation 905 for creating a visual representation of the desired contact attempt sequence. A program then performs the following operations 915-920 for generating the rules data for the contact attempt sequence in operation 915 and storing the rules data in a data structure as a template in operation 920. In a sense, the GUI tool converts the visual process flow into the appropriate data structures and logic, thereby creating a template. The user may then link an account in a calling campaign to that template in operation 925. The GUI tool can be, in effect, similar to a "wizard" program that guides the user to specifying a particular contact sequence, and establishes the appropriate data structures and logic to affect the desired outcome. This negates the requirement of a skilled administrator or programmer to create the desired contact attempt sequence for an account.

Figure 10:
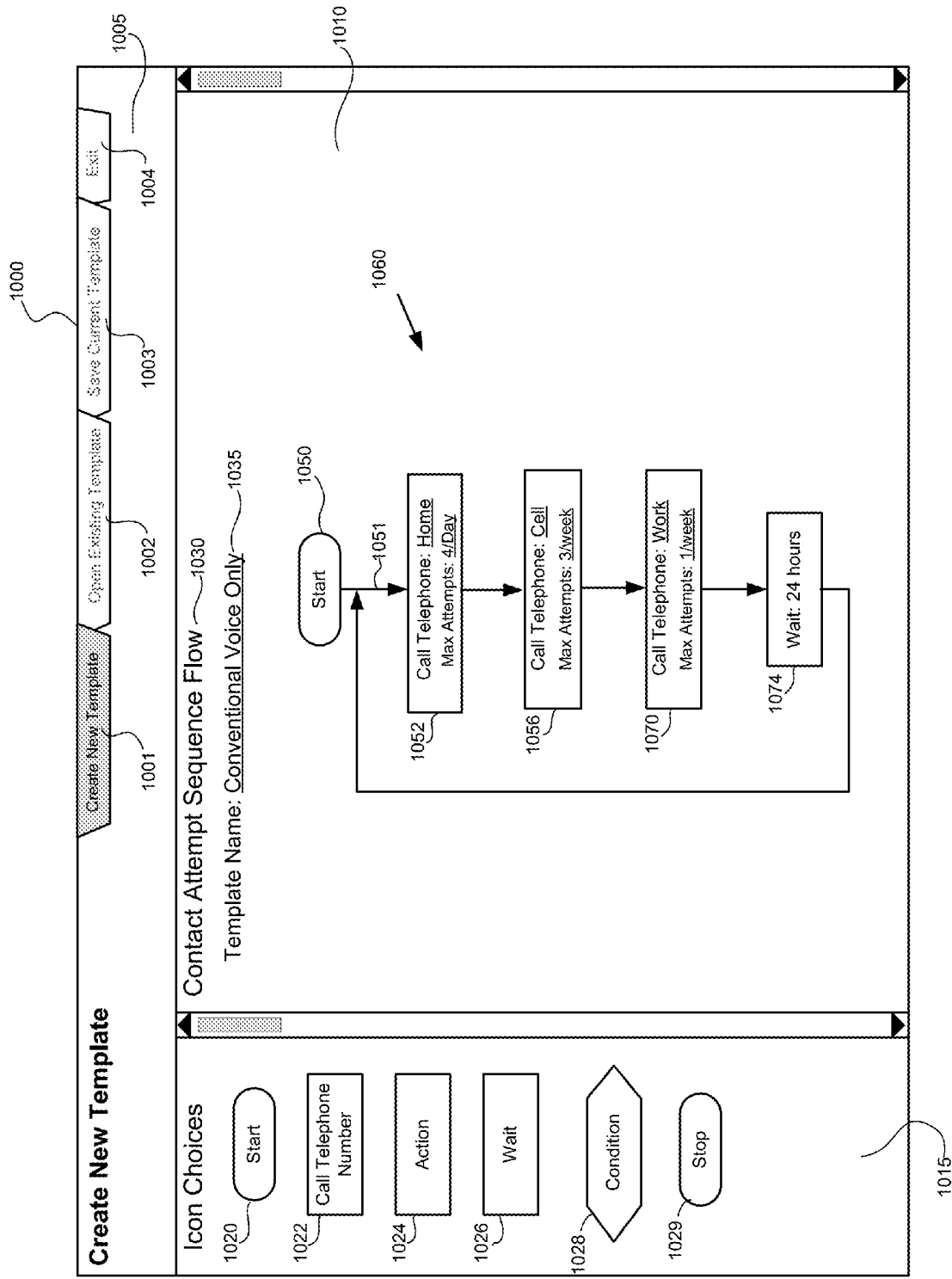
FIG. 10 represents one embodiment of a graphical user interface providing a tool for creating a template defining a contact sequence flow.

One such GUI is shown in FIG. 10. FIG. 10 illustrates a screen 1000 that a user may be presented with for generating a template for defining a contact attempt sequence. In this embodiment, a first section 1005 indicates the purpose, which is to define and create a new template, or an instance of a contact attempt sequence. At this stage, any sequence is not linked to any particular account, but can be done later after it is defined. The section 1005 may have various function tabs, such as a tab 1001 that is shown as being selected for creating a new template. Other function tabs allow an existing template to be opened 1002, the current template to be saved 1003, or to exit the GUI tool 1004. Templates can be created from scratch, or may be effectively created by opening an existing template, editing that template, and saving it under a new template name.

Another section 1015 of the screen 1000 displays a menu of icons that can be selected for creating the contact attempt sequence. These icons can be "dragged and dropped" to the main section 1010 for generating the contact sequence. The icons represent functions that can be used as building blocks to define the particular instance of the contact attempt sequence (e.g., template). The icons shown in FIG. 10 are illustrative, and other embodiments may have a different and/or more feature rich set of icons. However, the limited set shown is sufficient to illustrate the concepts and technologies for allowing a user to define a visually oriented process flow that is then used to define the template.

The "Start" icon 1020 is used to start a contact attempt sequence flow. This icon, when selected, prompts the user for any of the parameters associated with the overall contact attempt sequence. Similarly, the "Stop" icon 1029 is used to indicate the end of the contact attempt sequence. Usually, when a call attempt results in a "successful" completion (however that is defined), any further attempts to reach the account holder are terminated. In other words, no further contact numbers or call attempts to that account holder will be initiated and the contact attempt sequence is stopped.

The "Call Telephone Number" icon 1022 is used to identify a contact address to use to initiate an attempt. This icon may have various parameters associated with it, such as the type of number (e.g., address) to be used (e.g., cell phone number, home phone number, etc.). Other parameters may limit how many retries may occur, how many attempts within a time period, time between retries, etc. For simplicity, this is shown as referring to a telephone number, since in many embodiments that may be the preferred method of contact, but that does not mean the icon cannot also define other forms of contact, or that other icons could not be defined for initiating these other forms of contact.

The "Action" icon 1024 allows the user to specify an action that is to occur upon a condition occurring. For example, if a call attempt results in a disconnect announcement being detected, the action icon could "tag" that number for future removal or processing. Any number of different actions could be defined. For example, if the call is answered by an answering machine, the "action" icon could instruct a message to be played.

The "Wait" icon 1026 inserts a time delay. This can be defined in various ways, such as waiting a certain time period (e.g., wait at least 24 hours) or waiting for a certain event (e.g., wait until new week starts).

The "Condition" icon 1028 allows a test for various conditions to occur. These can be the status of a call attempt, a state in which the account holder resides, a delinquency level of the account holder, whether a message was left on an answering machine, current day of week, etc.

The number and type of icons displayed in the icon choices screen section 1015 can vary. It is possible to define a simplistic flow using only the start, stop, and select address icons. In some instances, the function of certain icons can be incorporated into other icons, as will be seen. For example, the function of the "Wait" icon 1026 could be defined as a type of "action" and therefore incorporated into the "Action" icon. In other instances, the function of waiting a certain amount of time can be incorporated into the "Call Telephone Number" icon 1022, via indication of certain parameters. As is often the case, there are various ways to indicate how a function may be defined and operate. In various embodiments, the same function may be indicated different ways, wherein one approach may offer flexibility for accommodating unusual conditions or contexts.

The main section 1010 is where the user defines the visual contact attempt sequence flow 1060 using the icons. This section is identified with a suitable heading 1030 along with the name of the particular flow 1035, which is referred to as a template name. The name of the template is often reflective of its purpose. In this example, the name of the template is "Conventional Voice Only" which reflects that the flow is a conventional contact attempt sequence for contacting an account holder and that the contact is based only on voice calls.

The first icon is the "Start" icon 1050. As will be seen, when this item is placed on the main section 1010, the user may define various parameters (discussed below). This icon 1050 is then connected to an instance of the "Call Telephone Number" icon 1052 using a connector 1051. However, as will be seen, the format of the "Call Telephone Number" icon 1052 changes once various parameters associated with it are defined. The icon 1052 reflects some of the key parameters, such as the type of number to be selected ("Home") and the maximum attempts per time period ("4/day").

The next icon is also an instance of the "Call Telephone Number" icon 1022, which is shown as the "Call Telephone Number" icon 1056. This instance reflects that the "cell" number is to be used, and it is associated with 3 maximum attempts per week. Similarly, the next icon 1070 is also an instance of the "Call Telephone Number" icon 1022 and is associated with calling the "work" number, and is limited to one attempt per week.

The overall flow shows that after these three numbers have been attempted, the next icon 1074, which is an instance of the "Wait" icon 1026, indicates to wait 24 hours before returning and attempting contact again with the home number.

In summary, this visual contact sequence 1060 is fairly intuitive in that it will first attempt to contact the account holder using their home number, then their cell number, and finally their work number, all with the indicated limitations on the number of attempts. Further, it will wait at least 24 hours before cycling through the contact numbers. Once a contact attempt is successful, the process terminates at that point in the flow. Thus, for purposes of simplicity, the "Stop" icon is not shown in this embodiment, as it would be possible to stop the flow at any instance of the "Call Telephone Number" icon, and showing the "Stop" icon at every location in the flow would unnecessarily complicate the flow.

This process flow 1060, named by the user as the "Conventional Voice Only" template, may be used with any account that has a home phone number, a cell phone number, and a work phone number indicated. If the account also has another phone number indicated (e.g., a secondary home phone number), then that phone will not be used in the contact attempt sequence. However, it can be appreciated that this additional number could easily be accommodated by altering the sequence to add another instance of the "Call Telephone Number" icon in the flow 1060.

On the other hand, if an account does not have all three numbers indicated (e.g., the account only indicates a home phone and cell phone), then one embodiment is to simply skip the processing associated with the "Call Telephone Number" icon 1070 specifying the work number. In other words, the flow is executed as if icon 1070 is removed.

Figure 11A:
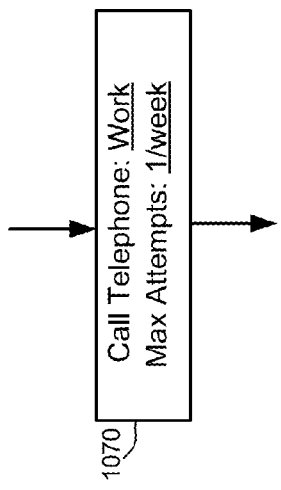
FIGS. 11A-11B illustrate one embodiment of processing associated with an icon used in defining a template.
Figure 11B:
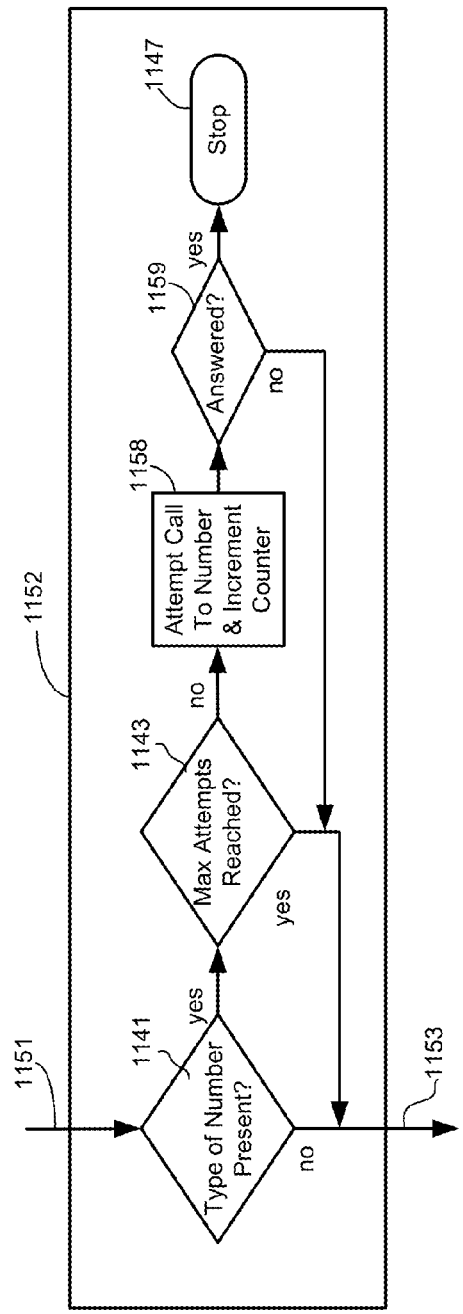

It is evident that there is additional logic processing represented by the "Call Telephone Number" icon 1070. Turning to FIG. 11A, this icon 1070 is examined further by itself. Specifically, the functionality found in FIG. 11A for this icon can be represented in FIG. 11B. In this case, the processing flow follows line 1151 and the functionality first involves determining whether the type of number indicated is present in the account, as shown by decision icon 1141. If the number is not present, then the processing continues via line 1153, effectively skipping any of the functionality shown. Assuming the number is present, the next test then determines whether any of the maximum attempts has been reached in operation 1143. For simplicity, this may involve determining whether any number-specific maximum attempts limits are reached for this number in the defined time period as well as the aggregate call attempts for an overall time period. If either limit is reached, the processing continues via line 1153 and no call attempts are made.

If, however, there are no restrictions limiting the call as determined in operation 1143, the process continues by attempting the call to the indicated number and incrementing the counter in operation 1158. If the call is answered in operation 1159, the process then stops in operation 1147. No further contact attempts are made. In effect, the overall contact attempt sequence flow from FIG. 10 is interrupted and stopped. If the call is not answered in operation 1159, then the process continues as indicated by line 1153.

The functionality of the "Call Telephone Number" icon 1070 can thus be constructed by various icons and built into a higher level icon function. The user may be able to create a library of such icons and have them shown on the icon choices screen section 1015. Thus, the "Stop" icon shown may be implicitly used in a flow by virtue of the icon being further defined as part of an icon. This arrangement further hides some of the functionality, so that a user can understand the overall flow 1060 in an easy manner.

With this abbreviated indication of the functionality of the icon instance 1152, it can be appreciated better how the flow shown in FIG. 10 operates in an intuitive manner. In practice, the functionality implemented in icon instance 1152 in FIG. 11B may be more complicated, but the full details are not shown for purposes of simplicity and to illustrate the concepts. It should be evident from the additional description discussed below as to how to create a contact attempt sequence flow. As will be seen below, additional parameters may be indicated in conjunction with the icons allowing specification of additional logic to use in a template.

Creating the Contact Sequence Flow

Figure 12:
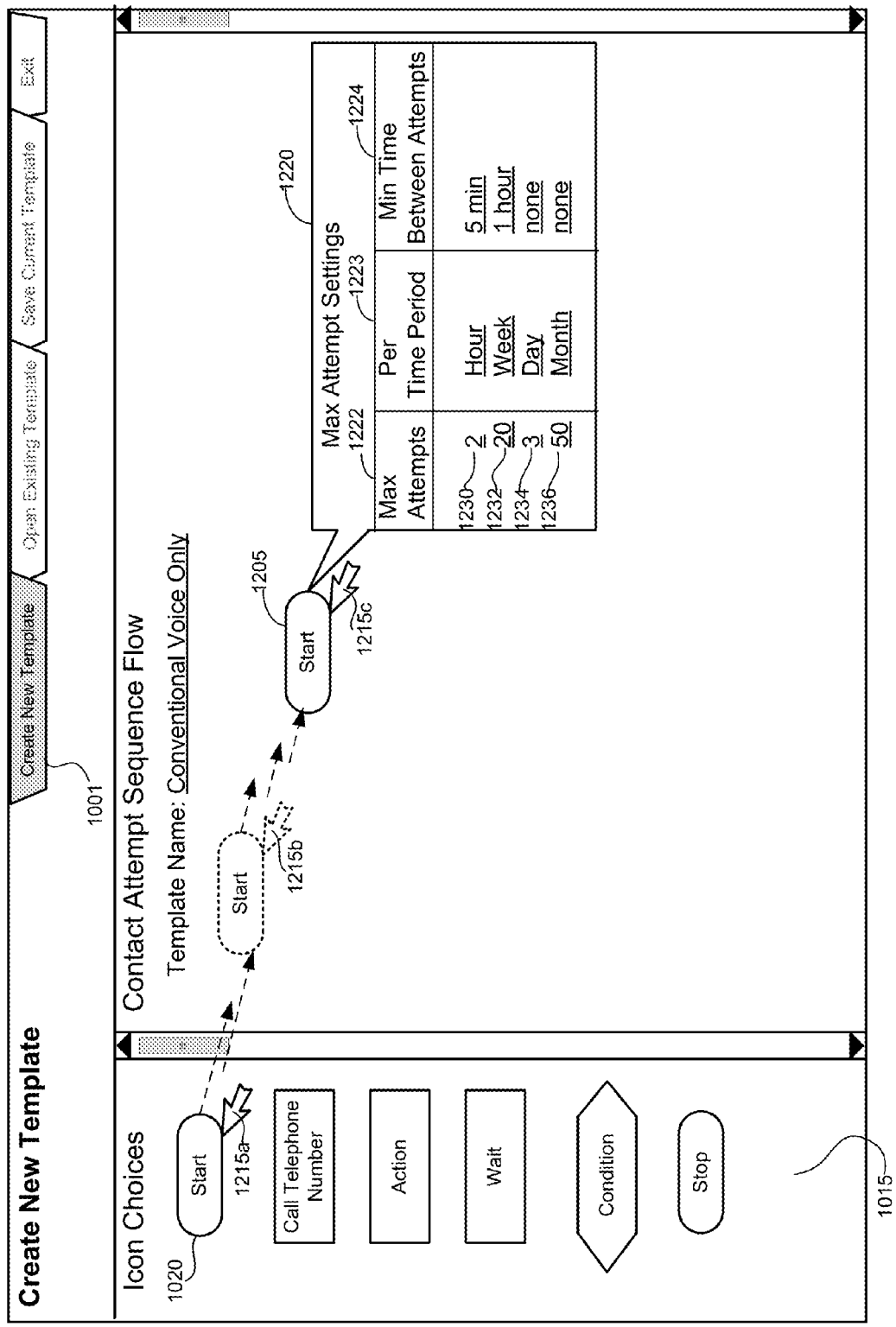
FIGS. 12, 13A, 13B, 14, 15A, 15B, 16A, and 16B illustrate various embodiments of using the graphical user interface tool used to define a template.

FIG. 12 shows how the aforementioned process flow can be created. It is assumed that the user has selected the Create New Template function tab 1001 to create a new process flow. In practice, a new template may be created by retrieving a prior template, editing it, and saving it under a new template name.

The process begins by selecting the "Start" icon 1020 from the icon choice section 1015 using the cursor 1215*a*. The cursor then drags the icon to the main section as represented by the dotted representation of the icon and cursor 1215*b*, until the icon is placed at its intended position as shown by icon 1205 and cursor 1215*c*. Although the process is illustrated by the user selecting and moving the icon via the cursor and a pointing device, such as a mouse, the process could occur by using a touch screen as well.

At this point, the user may right click on the icon 1205 to view a parameter box 1220. This allows the user to enter any of the contact sequence flow parameters that may be required. As it can be appreciated, the parameters required may vary in different embodiments. In this embodiment, the user is required to indicate a maximum number of attempts 1222 for all contact numbers for various time periods 1223, and a maximum time between attempts 1224. In this embodiment, the user has defined various limitations, such as shown in line 1232 where a maximum of 20 attempts per week are allowed, with repeats being no sooner than 1 hour between attempts. This embodiment shows four different types of limitations as represented in rows 1230-1236. For example, the first row 1230 indicates that 2 attempts in an hour are to occur, with a minimum time of 5 minutes between attempts. In practice, there may be more requirements or fewer limitations may be indicated. In other embodiments, drop-down menus or other mechanisms may be incorporated to allow the user to select various parameters, e.g. the time period. The user may also be able to define which columns are to be present in the parameter box 1220.

Figure 13A:
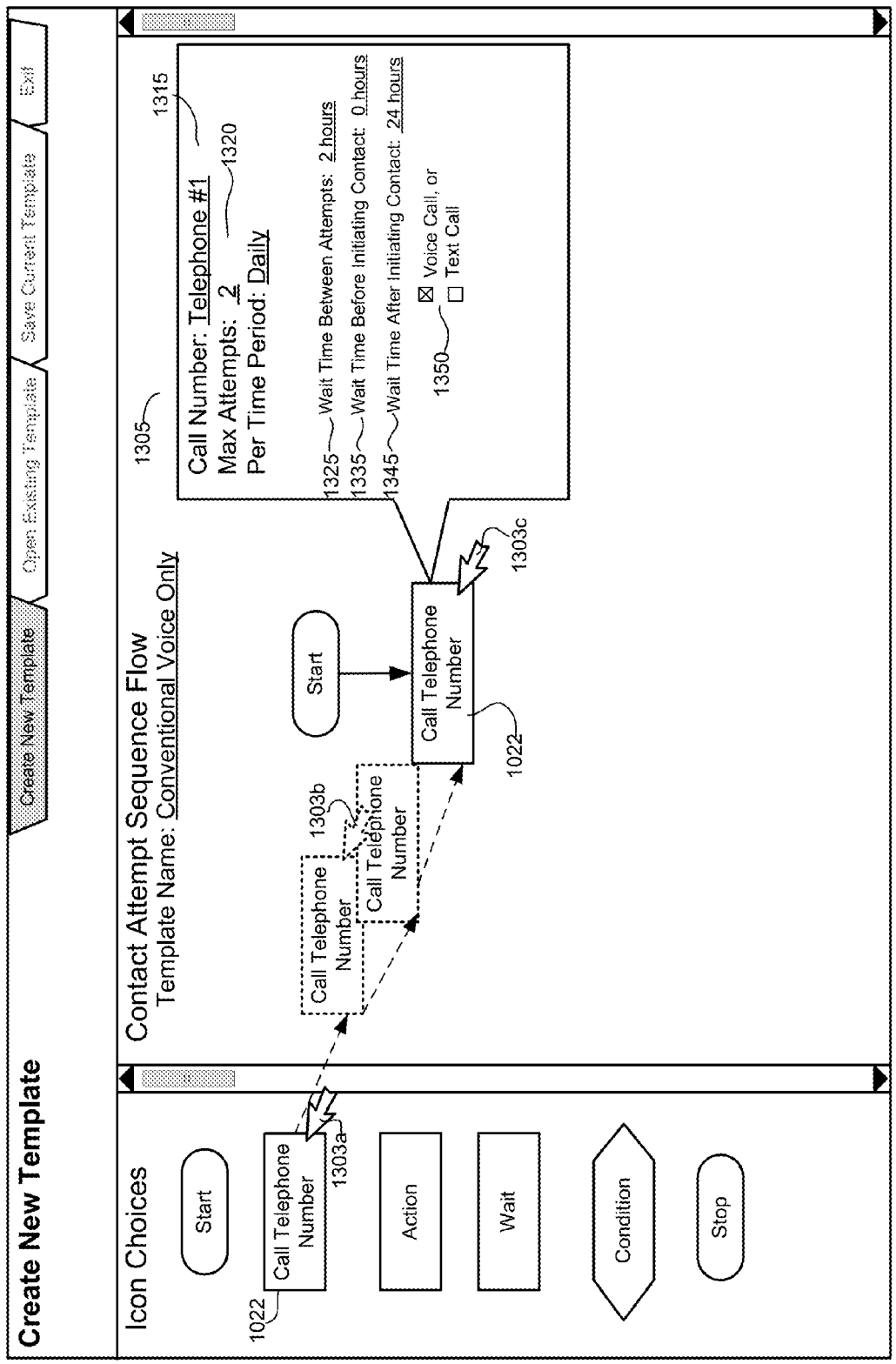

Turning to FIG. 13A, this figure illustrates the user selecting the "Call Telephone Number" icon 1022 to define the first number to call in the process flow. Again, this icon is dragged using the cursor 1303*a* to various positions 1303*b* as shown in dotted line form until the icon 1022 is placed in the final position shown by cursor 1303*c*. Right-clicking on the icon 1022 in its final position brings up a parameter box 1305 which requires a number of parameters to be provided by the user. First of all, the user must select the number to call, which is indicated 1315 as the type of number ("Home"). The maximum number of attempts in a specified time period is provided in the next lines 1320. In this embodiment, it is no more than 2 attempts/day.

The next set of parameters in the parameter box 1305 illustrates other aspects which can be indicated. Line 1325 indicates a time period to wait between events, which is specified as two hours. The next line 1335 indicates a wait time before initiating contact, which is zero hours. In other words, as soon as this icon is executed, a call attempt will be made. The next line 1345, however, indicates that after making an attempt, which is unsuccessful, then 24 hours should pass before executing the next icon in the flow. Finally, another menu option 1350 may allow the user to indicate whether the contact to the telephone number is to occur via as a voice or text call. In this example, it is selected as a voice call.

Figure 13B:
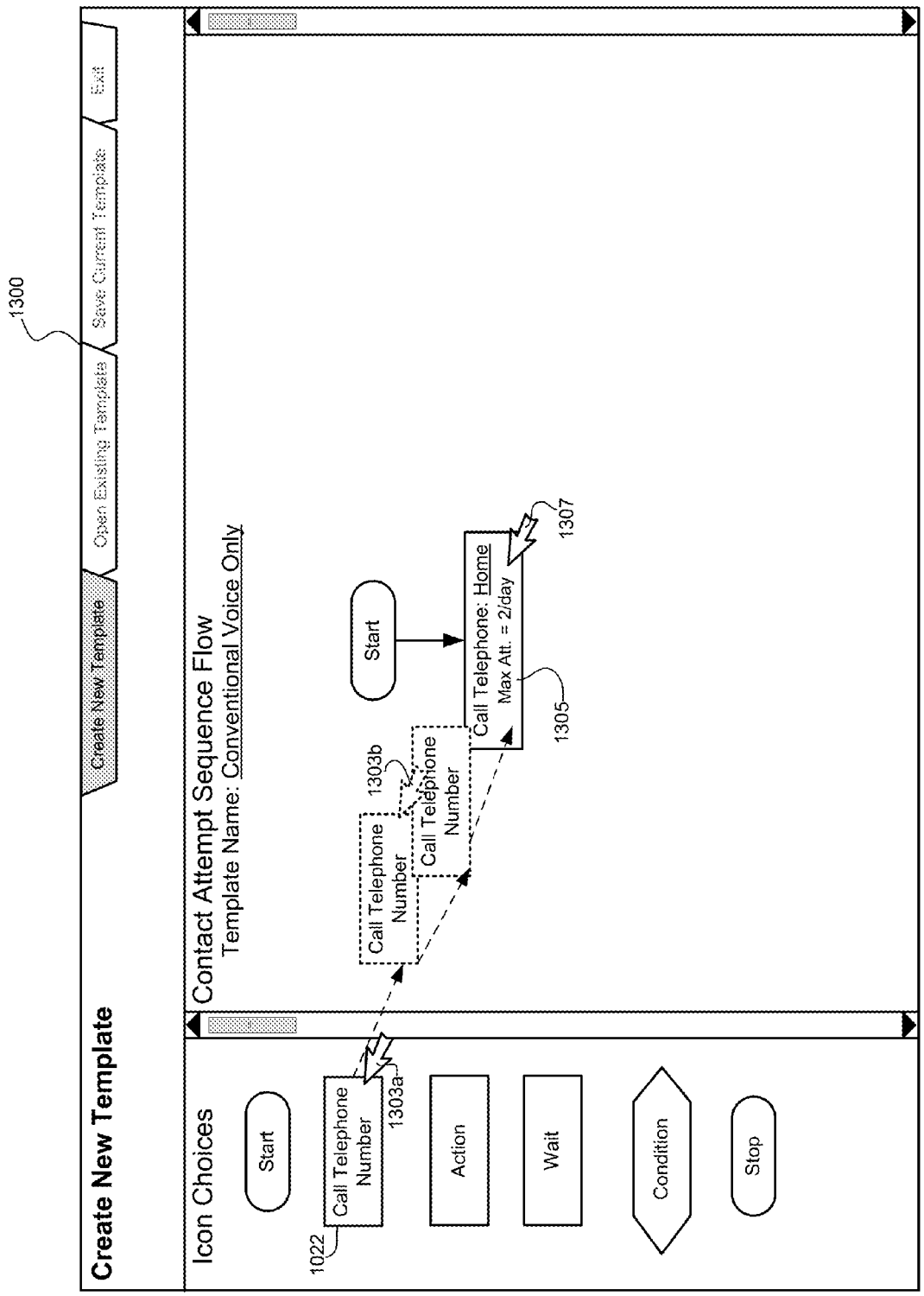

Once the parameters have been defined, the icon 1022 shown in FIG. 13A in the main section 1010 changes to reflect that it is an instance of the "Call Telephone Number" icon 1305 as shown in FIG. 13B. In FIG. 13B, the generic icon 1022 changes to icon 1305 to reflect the number type to be called and the maximum defined attempts. It may be presumed that in the absence of an indicator that the call defaults to a voice type. If the call were of a text type, an indication could be included to reflect this in icon 1305.

Figure 14:
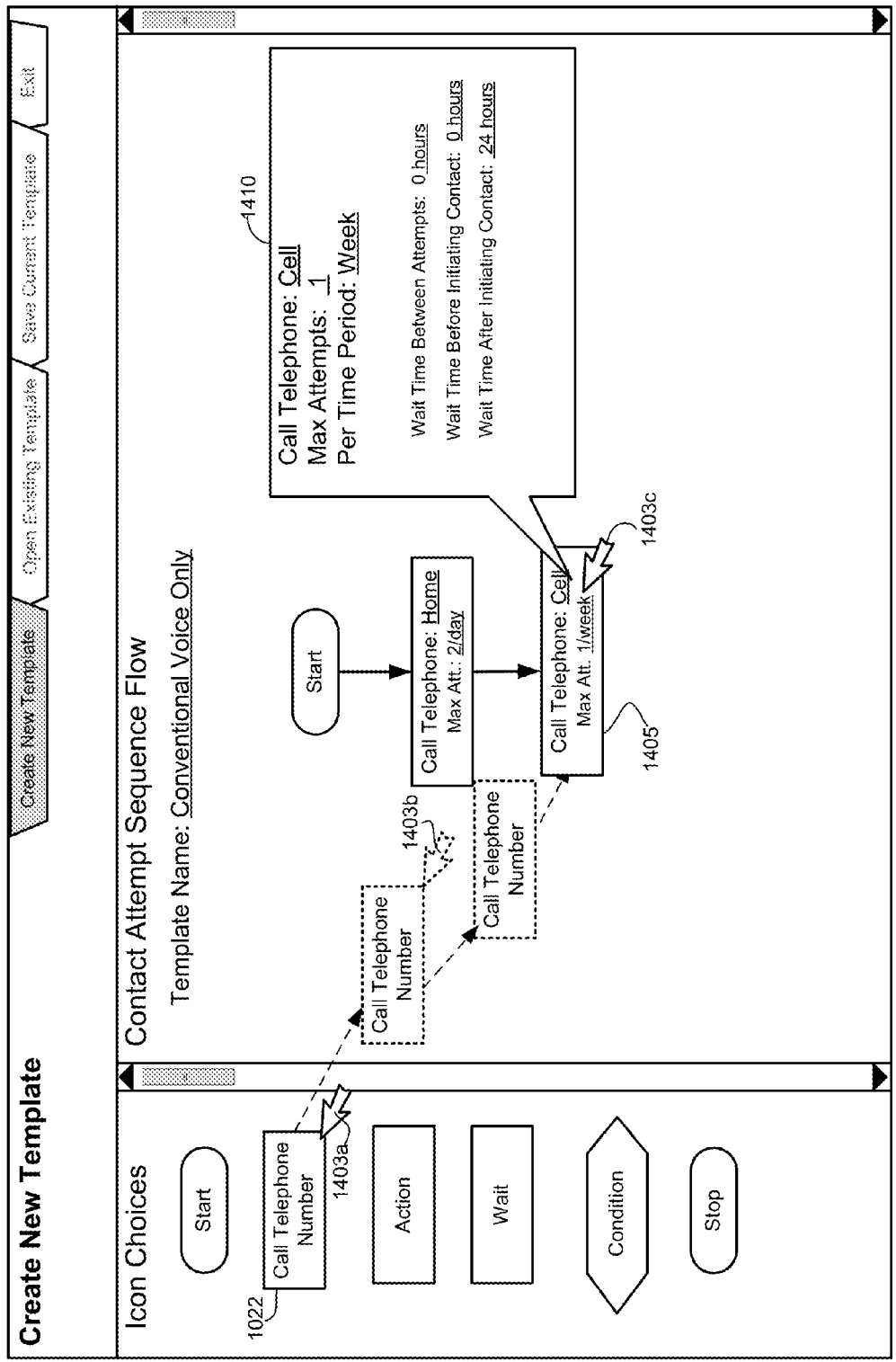

FIG. 14 shows how the "Call Telephone Number" icon 1022 could be selected again by the user, dragged via cursor 1403a, 1403b, 1403c to the main section as shown by icon 1405. The format of the icon reflects the selected parameters, which were entered into the parameter box 1410 by the user. In this example, there is no waiting time before making the call attempt and no waiting time after the call attempt is made before proceeding to the next icon in the process flow. In addition, once contact has been made (e.g., leaving a voice message on an answering machine), then 24 hours should be waited before attempting to contact the account holder again. This illustrates that flexibility can be offered as to how to contact the account holder under various circumstances.

Figure 15A:
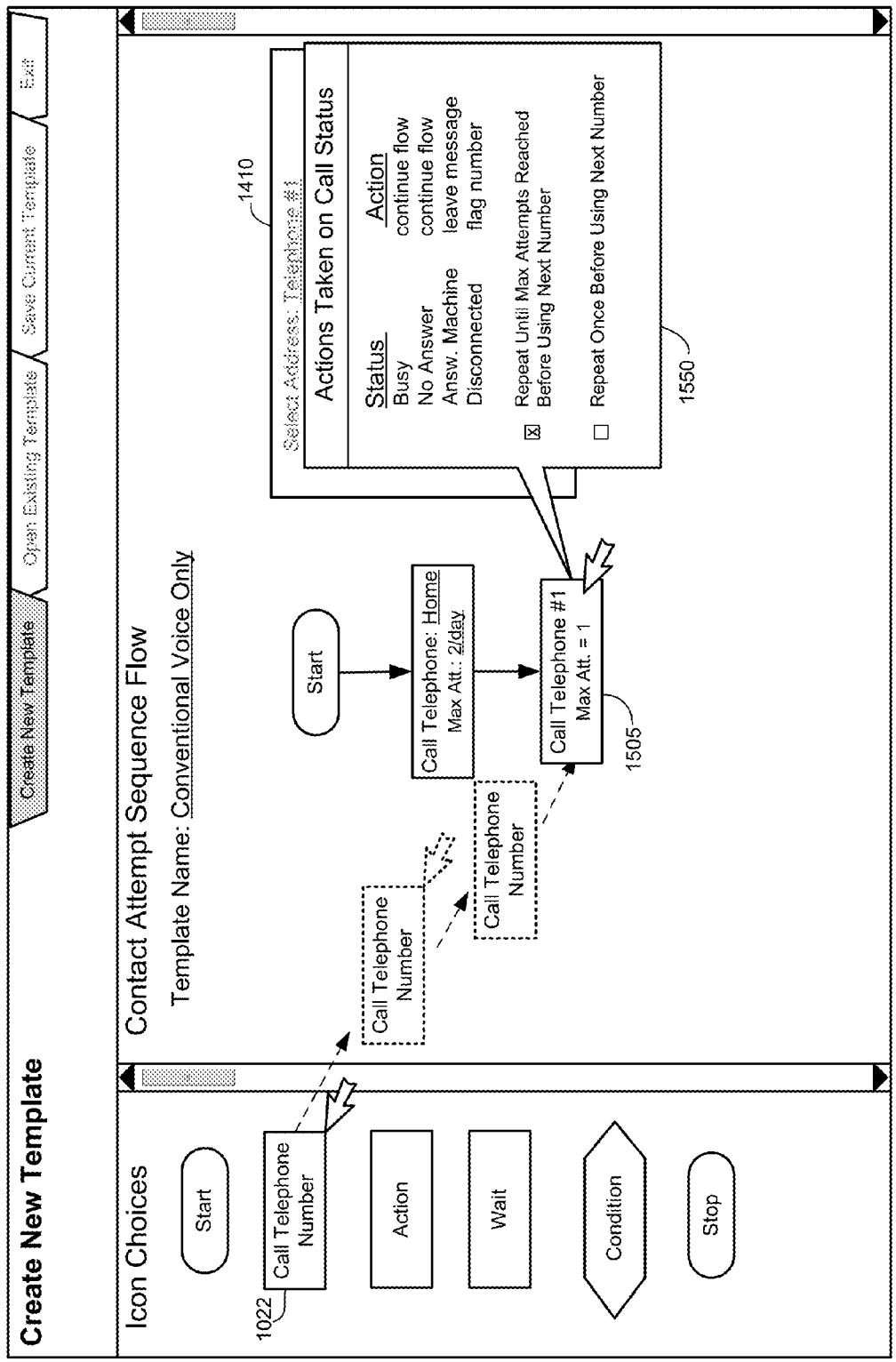

Turning briefly to FIG. 15A, this figure illustrates how the user may be presented with more than one parameter box. There may be a number of categories of parameters that are associated with an icon. Recall that the parameter box 1410 allowed the user to indicate which number to attempt and how many times over a time period. Rather than have one parameter box with a large number of parameters to fill, a number of parameter boxes may be presented and selected by the user. FIG. 15A shows another icon 1505 and its associated parameter box 1550 that overlays another parameter box 1410. The user may be able to select tabs, select a drop down menu, etc. to display the desired parameter box. In this embodiment, this additional parameter box 1550 allows the user to specify parameters associated with actions to be taken by the dialer upon encountering a particular status. For example, the user could define that upon encountering a "busy" status on the call attempt that the response should be to "continue flow." Similarly, if the call is not answered, the call attempt sequence flow should continue. On the other hand, if the call attempt encounters an answering machine, the response should be to leave a message. If the status is that an announcement is played indicating the number is disconnected or no longer in service, the action should be to flag that number so no further attempts are made using that number.

In addition, other parameters may allow the user to indicate whether all attempts allowable for this number are to be made before sequencing to the next number in the process flow, or whether the next number in the process flow should be processed immediately after an unsuccessful attempt.

As mentioned earlier, some of the functions in an icon can also be indicated via parameters in other functions. It may be be possible for the user to insert an "Action" icon in the process flow to accomplish the same action as indicated in the parameter table 1550. This provides flexibility as to how particular actions are to occur. For example, it may be possible to detect a condition of an answering machine answering the call, and then define an action of leaving a message.

Although only two parameter boxes 1550, 1410 are shown, there may be several parameter boxes, which allows related parameters to be grouped together and presented as a group. In various embodiments, the parameters presented may vary in complexity and scope, and may have default values associated with each of the parameters.

Figure 15B:
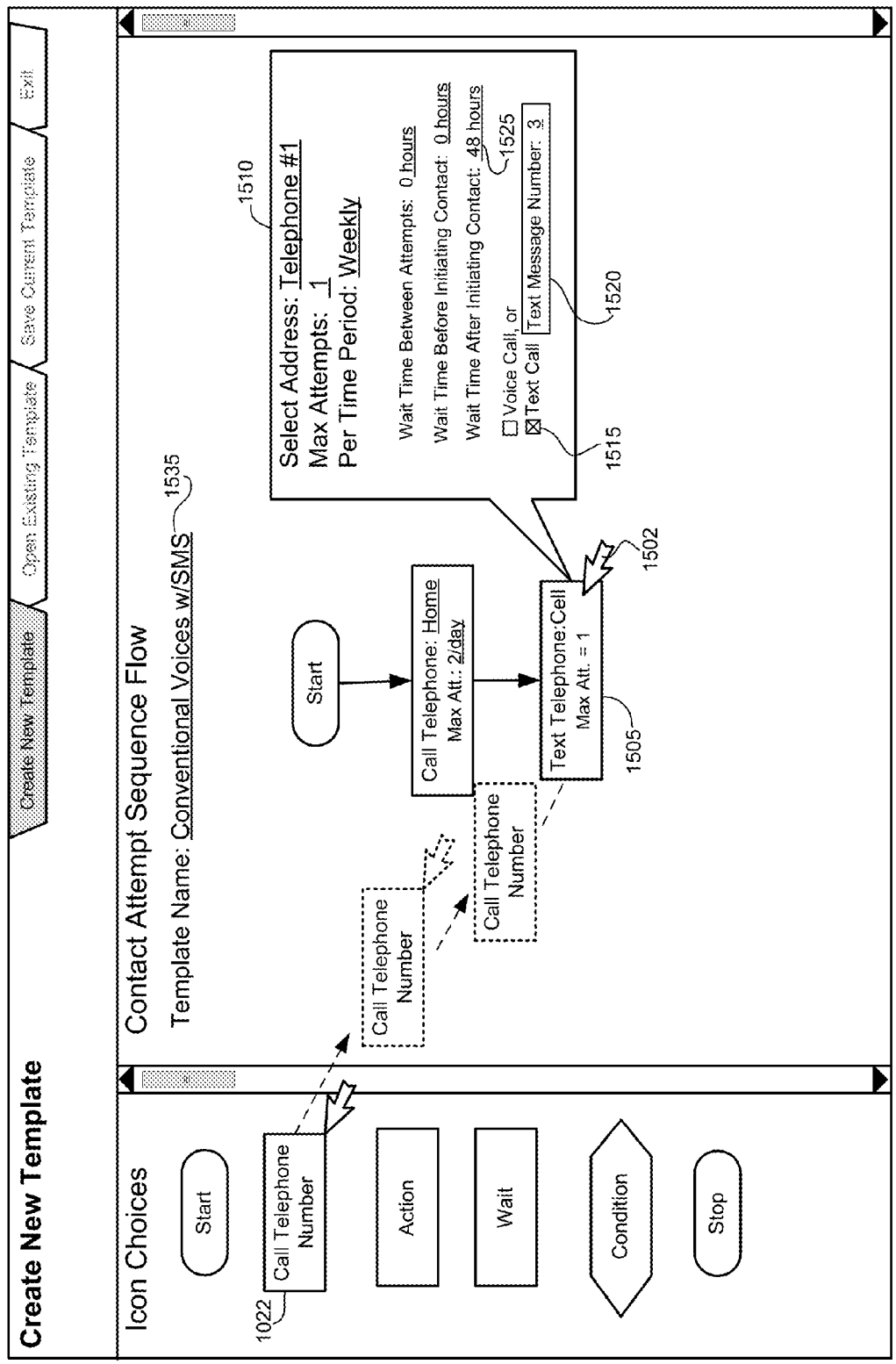

FIG. 15B illustrates how a different template could have been defined by the user, based on modifying the aforementioned template or copying portions thereof into a new template. In this case, the user desires to make a new template that incorporates sending a SMS text call as part of the contact attempt sequence. Turning to FIG. 15B, it is seen that a different template has been defined, as reflected by the different template name 1535, "Conventional Voice w/SMS." This may reflect, for example, that this is a conventional contact attempt sequence for reaching the account holder with a SMS follow up attempt.

In this case, the same "Call Telephone Number" icon 1022 is selected and dragged using the cursor 1502 by the user to create the specific instance of the icon 1505. A parameter box 1510 is presented to the user, but in this case the user has selected the checkbox 1515 indicating that a text call is to be placed, as opposed to a voice call. Further, when this box is selected, another box 1520 may be presented to the user. In this box 1520, the user has selected to send Text Message Number 3. Presumably, the user knows the content of this message number, or another selection box could allow the user to select a particular message. In this case, the user has also indicated that after attempting contact (e.g., sending the text call), the process flow should wait 48 hours 1525 before continuing the process flow.

To provide some context to a possible application of the flow presented in FIG. 15B, the overall flow in FIG. 15B may involve first calling a debtor using their home number, but making no more than 2 attempts per day. Then, a text message is sent to their cell phone, but after being sent, a delay of at least 48 hours occurs before continuing the flow. This allows the user to presumably review the text message, and potentially respond. Since the remaining flow has not been defined yet, FIG. 15B does not show what the remaining flow is. However, FIG. 15B illustrates how the visual process flow for a contact attempt sequence could incorporate the concept of placing a text call.

Figure 16A:
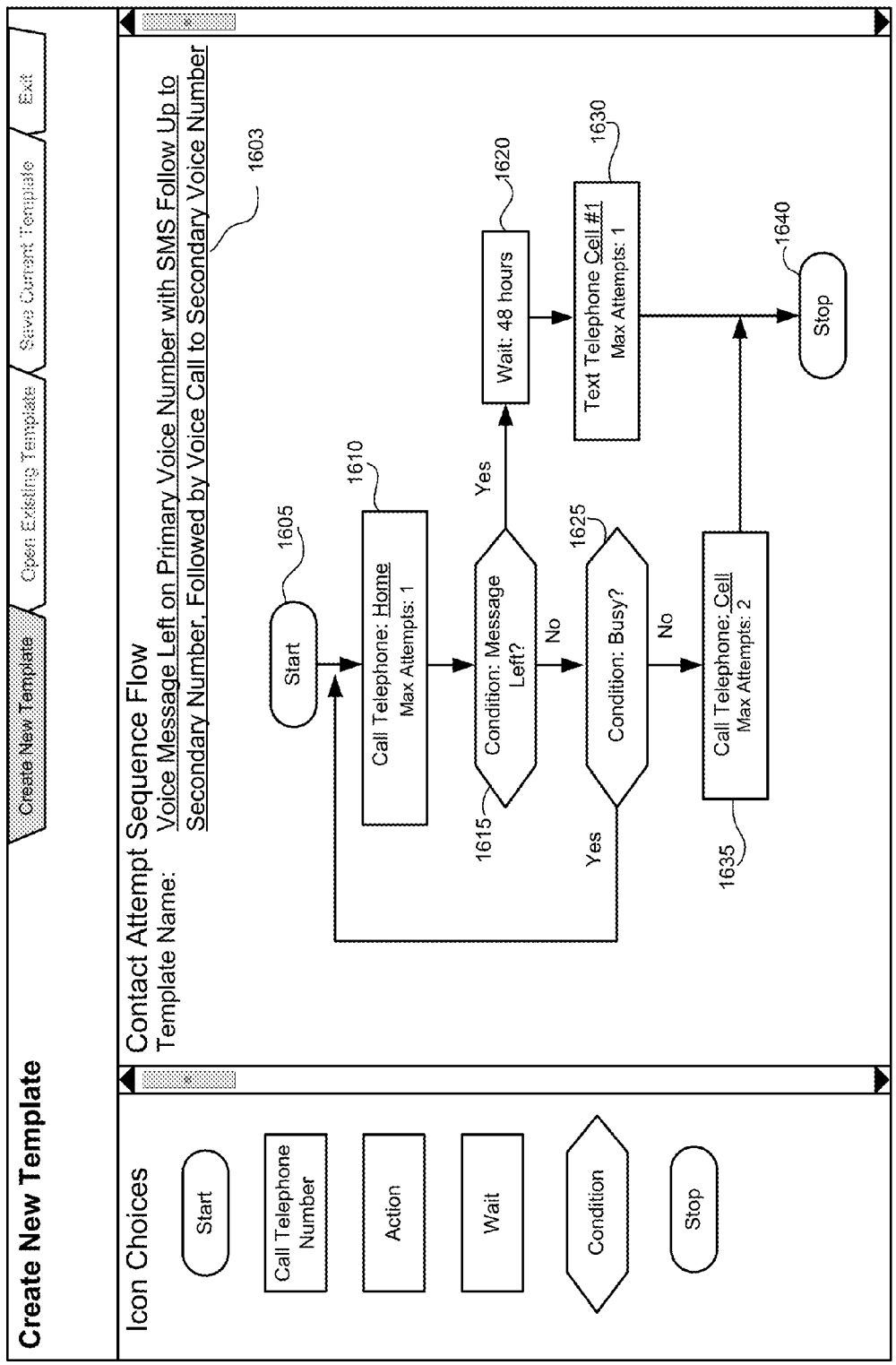
Figure 16B:
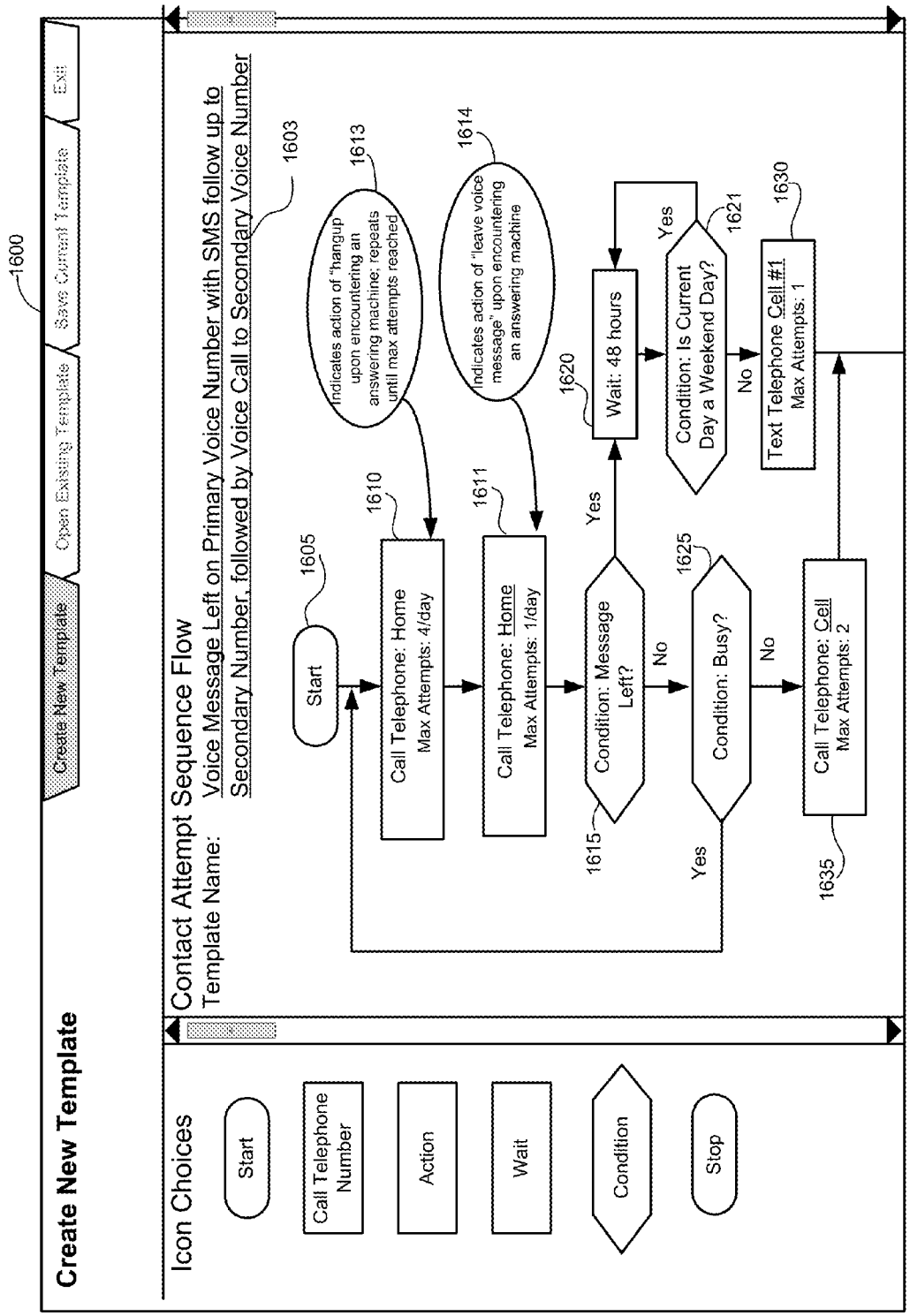

Additional Template Examples (FIGS. 16A and 16B)

Two additional template examples are presented to further illustrate application of the concepts for defining a visual contact attempt sequence. Although the aforementioned techniques could be used for creating and editing the templates, it is possible to use other graphical tools for creating the template.

FIG. 16A illustrates a template entitled "Voice Message Left on Primary Voice Number with SMS Follow Up to Secondary Number, Followed by Voice Call to Secondary Voice Number" 1603. This template name is descriptive as to its purpose, but the user may choose to use a shorter title (e.g., call flow #12), which can be referenced as to its purpose.

In this case, the call attempt sequence is to call the primary telephone number of the account holder (e.g., home number) and leave a voice message, if that call is answered by a voice mail system or answering machine. If a busy condition is reached, the call is reattempted. If neither occurs, then two attempts will be made to the account holder's cell phone. If these are unsuccessful, the process stops. On the other hand, if a message is left after calling the home phone, then a text message is subsequently left on the account holder's secondary number (cell phone). The rationale may include that once a message is left with the user, subsequent voice call attempts cease, while the contact center waits for a callback from the account holder. If no callback is received after leaving a message, a reminder text message is sent to the account holder on their cell phone.

The process flow begins with the "Start" icon 1605. Associated parameters needed for the overall flow may be defined at this point. Next, a call is attempted to the account holder's home phone, with a maximum of one attempt as shown in icon 1610. If a message is left on an answering machine in icon 1615, a delay of 48 hours occurs as indicated by icon 1620. Then, presuming no callback has occurred, a text message is sent to the account holder's cell phone in icon 1630. The process then stops. In this case, a voice message was left on the account holder's home phone and a text message was later left on their cell phone. The process may stop in icon 1640 since it can be presumed that the account holder was informed via these two forms of messaging and any further attempts may be deemed to annoy the account holder or violate some policy/regulation.

The initial call to the home phone may not have resulted in an answering machine answering, and thus no message may be left as a result of the execution of icon 1615. Next, a test is made to see whether a busy condition was reached in icon 1625. If so, then the flow loops back to icon 1610 where another attempt is made. Presumably, there may be some minor delay incorporated (e.g., two minutes) before reattempting the call. If a busy condition is not reached in icon 1625, then the call has not been answered. At this point, the contact attempt sequence may then use the account holder's cell phone number in icon 1635, where two attempts are made.

This type of contact flow may be suitable for various business applications, but may require modification based on the particular application. For example, in this process flow, if an answering machine answers the initial call to the home number, a message will be left. However, it may be desirable, instead, to make several attempts to the home number without leaving a message in an attempt to reach the right party and after several attempts resulting in the answering machine picking up, then a message is left. In another variation, once a voice message is left on the answering machine, the text message is sent to the account holder's cell phone urging the account holder to call back. However, assuming that the contact center is not open on weekends, it may be desirable to avoid leaving such a text message during the weekend, as it may result in frustrating the account holder if they do call back.

The call attempt sequence shown in FIG. 16A can be easily modified to accommodate these changes. The template could be edited by inserting additional icons into the process flow to accomplish these additional features. Turning to FIG. 16B, the main distinctions can be seen with respect to the "Call Telephone Number" icons 1610 and 1611, and the addition of the "Condition" icon 1621.

Turning first to the "Call Telephone Number" icon 1610 of FIG. 16B, this reflects that the home telephone number will be attempted no more than four times in a day. Further, parameters 1613 associated with this icon 1610 have been defined so that the action in response to reaching an answering machine is to "hangup."

However the next attempt after the fourth attempt of reaching an answering machine (i.e., on the fifth attempt), it is desirable to instead leave a voice mail message. This is indicated in "Call Telephone Number" icon 1611 which calls the same telephone number, but for only 1 attempt. The parameters 1614 associated with this icon 1611 indicate that if an answering machine is encountered, a voice message will be left on the answering machine. Thus, these two icons will perform the desired action of calling the home telephone number up to four times and not leave a message if answered by an answering machine. However on the fifth attempt, leave a message if the call is answered by an answering machine.

If a message is left as determined in icon 1615, then the process will wait at least 48 hours before following up with a text message as indicated in operation 1620. Next, a test occurs in Condition icon 1621 to determine whether the current day is a weekend day (e.g., Saturday or Sunday). If so, the process loops back to icon 1620. This ensures that the next time the "Condition" icon 1621 is encountered, the weekend will have passed. Thus, the next icon is the "Text Telephone Number" icon 1630 which sends the text to the account holder's cell telephone.

FIGS. 16A and 16B illustrate the relative ease in which complex contact attempt sequences can be defined using a GUI tool. Any number of functional icons can be used to define the contact attempt sequence for a particular application. The definition of the individual icons may vary from what is disclosed herein in order to provide flexibility in defining contact attempt sequences. Those skilled in the art will recognize that well known techniques can compile the graphical representation of the contact attempt sequence into the appropriate logic and data structures necessary. Further, it is not required that the data structures generated correspond to the data structures previously discussed. Those data structures were designed to illustrate the concepts and technologies, and were not designed to limit how other embodiments may structure data.

Exemplary Processing Device Architecture

Figure 17:
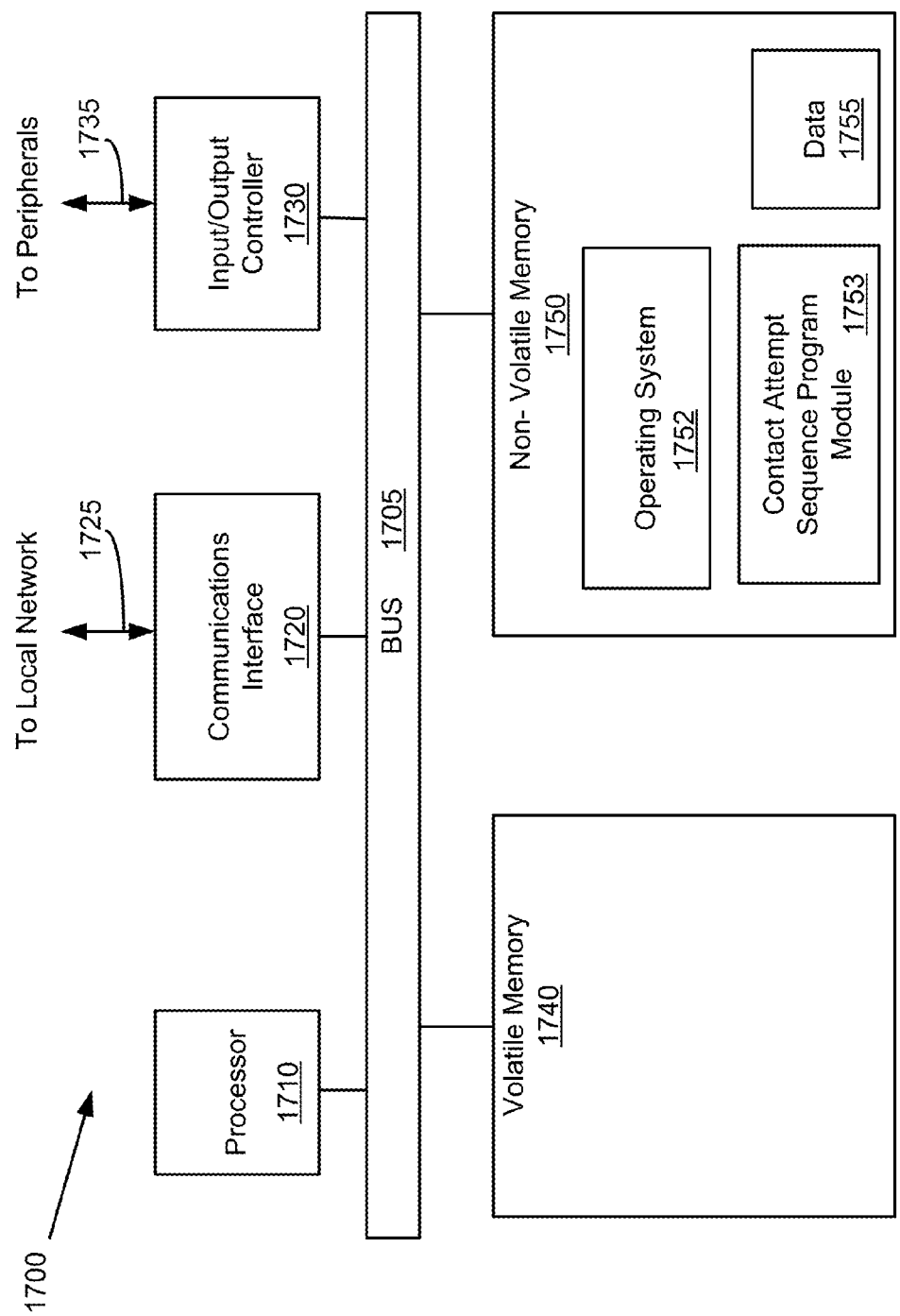
FIG. 17 illustrates an architecture of a processing system for practicing the concepts and technologies disclosed herein.

As discussed in conjunction with FIG. 1, the contact center architecture 100 may comprise various components that comprise a processing system. FIG. 17 is an exemplary schematic diagram of a processing system 1700 that may be used in an embodiment to practice the technologies disclosed herein. For instance, in particular embodiments, this could represent the administrator workstation 185 shown in FIG. 1 or other component of FIG. 1. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 17, the processing system 1700 may include one or more processors 1710 that may communicate with other elements within the processing system 1700 via a bus 1705. The processor 1710 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1700 may also include one or more communications interfaces 1720 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing system 1700 may also include an input/output controller 1730 to communicate with one or more input devices or peripherals such as, but not limited to: a keyboard, a mouse, a touch screen/display input, microphone, pointing device, etc. In addition, the input/output controller 1730 may also communicate with output devices or peripherals, such as displays, printers, speakers, headsets, banner displays, etc.

The processor 1710 may be configured to execute instructions stored in volatile memory 1740, non-volatile memory 1750, or other forms of computer-readable storage media accessible to the processor 1710. The volatile memory 1740 may comprise various types of memory technologies, including, but not limited to: random access memory ("RAM"), dynamic random access memory ("DRAM"), static random access memory ("SRAM"), and other forms well known to those skilled in the art. The non-volatile memory 1750 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1750 may store program code and data, which also may be loaded into the volatile memory 1740 at execution time. Specifically, the non-volatile memory 1750 may store one or more computer program modules such as the contact attempt sequence program module 1753, related data 1755, and/or operating system code 1752 containing instructions for performing the process and/or functions associated with the technologies disclosed herein. The volatile memory 1740 and/or non-volatile memory 1750 may be used to store other information including, but not limited to: records, applications, programs, scripts, source code, object code, byte code, compiled code, interpreted code, machine code, executable instructions, or the like. These may be executed or processed by, for example, the processor 1710. These may form a part of, or may interact with, the contact attempt sequence program module 1753 and/or the related data 1755.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. For example, the concepts and technologies have been illustrated with respect to a contact center placing a communication (e.g., a call) to an account holder for debt collection purposes, but may apply to placing communications for other types of reasons. Further, the contact attempt sequence was largely illustrated by using calls (voice or text) to a telephone number, but other types of communication and contact addresses could be used.

Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for identifying a contact address to use in attempting to contact a party associated with a delinquent account by a contact center comprising:
   using a graphical user interface tool by a user to define a visual representation of a contact attempt sequence flow, wherein the visual representation of the contact attempt sequence flow comprises a plurality of icons connected in a sequential order that includes a first contact icon defining a first contact address, a second contact icon defining a second contact address, and at least one of an action icon defining an action to be carried out based on a corresponding action value defined by the user, a wait time icon defining a wait time to be carried out based on a corresponding wait time value defined by the user, and a condition icon defining a condition to be evaluated based on a corresponding condition value defined by the user;
   converting the visual representation of the contact attempt sequence flow into a template representing the plurality of icons connected in the sequential order;
   using the template by a dialer component to initiate contact attempts to the party; and
   based on the sequential order:
   initiating one or more contact attempts to the party using the first contact address defined by the first contact icon by the dialer component in response to evaluating one or more current values with respect to at least one of the corresponding action value for the action to be carried out defined by the action icon, the corresponding wait time value for the wait time to be carried out defined by the wait time icon, and the condition value for the condition to be evaluated defined by the condition icon; and
   after a number of unsuccessful contact attempts has occurred using the first contact address, initiating another contact attempt to the party using the second contact address defined by the second contact icon by the dialer component in response to evaluating another one or more current values with respect to at least one of the corresponding action value for the action to be carried out defined by the action icon, the corresponding wait time value for the wait time to be carried out defined by the wait time icon, and the condition value for the condition to be evaluated defined by the condition icon, wherein the second contact address is a work telephone number and the template indicates that no more than one contact attempt per week should be initiated to the second contact address.

2. The method of claim 1, further comprising:
   using the graphical user interface tool to indicate the number of unsuccessful contact attempts that should occur using the first contact address before using the second contact address.

3. The method of claim 2, wherein the number of unsuccessful contact attempts is indicated in a context of a defined time period.

4. The method of claim 1, wherein the visual representation of the contact attempt sequence flow further indicates that a text call should be attempted to the party.

5. A system for initiating contact to a party associated with a delinquent account comprising:
a processor configured to:
receive input via a graphical user interface from a user for defining a visual representation of a contact attempt sequence flow, wherein the visual representation of the contact attempt sequence flow comprises a plurality of icons connected in a sequential order that includes a first contact icon defining a first contact address, a second contact icon defining a second contact address, and at least one of an action icon defining an action to be carried out based on a corresponding action value defined by the user, a wait time icon defining a wait time to be carried out based on a corresponding wait time value defined by the user, and a condition icon defining a condition to be evaluated based on a corresponding condition value defined by the user; and
convert the visual representation of the contact attempt sequence flow into a template representing the plurality of icons connected in the sequential order; and
a dialer component configured to:
use the template to initiate contact attempts to the party; and
based on the sequential order:
initiate one or more contact attempts to the party using the first contact address defined by the first contact icon in response to evaluating one or more current values with respect to at least one of the corresponding action value for the action to be carried out defined by the action icon, the corresponding wait time value for the wait time to be carried out defined by the wait time icon, and the condition value for the condition to be evaluated defined by the condition icon; and
after a number of unsuccessful contact attempts has occurred using the first contact address, initiate another contact attempt to the party using the second contact address defined by the second contact icon in response to evaluating another one or more current values with respect to at least one of the corresponding action value for the action to be carried out defined by the action icon, the corresponding wait time value for the wait time to be carried out defined by the wait time icon, and the condition value for the condition to be evaluated defined by the condition icon, wherein the second contact address is a work telephone number and the template indicates that no more than one contact attempt per week should be initiated to the second contact address.

6. The system of claim 5, wherein the dialer component processor is further configured to:
initiate a text call to the party in response to the template indicating the text call be initiated to the party.

7. The system of claim 5, wherein the template indicates a threshold value with respect to the number of unsuccessful contact attempts using the first contact address and a time period associated with the threshold value.

8. A non-transitory computer readable medium storing computer instructions that when executed by a dialer component cause the dialer component to:
retrieve a template created based on a visual representation of a contact attempt sequence flow defined by a user on a graphical user interface, wherein the visual representation of the contact attempt sequence flow comprises a plurality of icons connected in a sequential order that includes a first contact icon defining a first contact address, a second contact icon defining a second contact address, and at least one of an action icon defining an action to be carried out based on a corresponding action value defined by the user, a wait time icon defining a wait time to be carried out based on a corresponding wait time value defined by the user, and a condition icon defining a condition to be evaluated based on a corresponding condition value defined by the user;
use the template to initiate contact attempts to a party associated with a delinquent account; and
based on the sequential order:
initiate one or more contact attempts to the party using the first contact address defined by the first contact icon in response to evaluating one or more current values with respect to at least one of the corresponding action value for the action to be carried out defined by the action icon, the corresponding wait time value for the wait time to be carried out defined by the wait time icon, and the condition value for the condition to be evaluated defined by the condition icon; and
after a number of unsuccessful contact attempts has occurred using the first contact address, initiate another contact attempt to the party using the second contact address defined by the second contact icon in response to evaluating another one or more current values with respect to at least one of the corresponding action value for the action to be carried out defined by the action icon, the corresponding wait time value for the wait time to be carried out defined by the wait time icon, and the condition value for the condition to be evaluated defined by the condition icon, wherein the second contact address is a work telephone number and the template indicates that no more than one contact attempt per week should be initiated to the second contact address.

9. The non-transitory computer readable medium of claim 8, wherein the instructions further cause the dialer component to:
initiate a text call to the party in response to the template indicating the text call be initiated to the party.

* * * * *